(12) United States Patent
Wynn et al.

(10) Patent No.: US 9,788,602 B2
(45) Date of Patent: Oct. 17, 2017

(54) BASKETBALL INSOLE

(71) Applicant: Spenco Medical Corporation, Waco, TX (US)

(72) Inventors: William Sterling Wynn, Crawford, TX (US); Jacob Martinez, Temple, TX (US); Raymond J. Anthony, George Town, KY (US); David B. Granger, Lorena, TX (US); Paul Lewis, Calgary (CA)

(73) Assignee: Implus Footcare, LLC, Durham, NC (US)

( * ) Notice: Subject to any disclaimer, the term of this patent is extended or adjusted under 35 U.S.C. 154(b) by 0 days.

(21) Appl. No.: 14/422,066

(22) PCT Filed: Aug. 28, 2013

(86) PCT No.: PCT/US2013/057141
§ 371 (c)(1),
(2) Date: Feb. 17, 2015

(87) PCT Pub. No.: WO2014/036176
PCT Pub. Date: Mar. 6, 2014

(65) Prior Publication Data
US 2015/0237959 A1    Aug. 27, 2015

Related U.S. Application Data

(60) Provisional application No. 61/696,050, filed on Aug. 31, 2012, provisional application No. 61/710,426, filed on Oct. 5, 2012.

(51) Int. Cl.
*A43B 7/14*    (2006.01)
*A43B 13/38*   (2006.01)
(Continued)

(52) U.S. Cl.
CPC .............. *A43B 13/383* (2013.01); *A43B 5/00* (2013.01); *A43B 7/142* (2013.01); *A43B 7/143* (2013.01);
(Continued)

(58) Field of Classification Search
CPC ....... A43B 7/142; A43B 7/1425; A43B 7/143; A43B 7/1435; A43B 7/144; A43B 7/1445;
(Continued)

(56) References Cited

U.S. PATENT DOCUMENTS

| 333,595 A | 1/1886 | Butterfield |
|---|---|---|
| 360,127 A | 3/1887 | Wallis |

(Continued)

FOREIGN PATENT DOCUMENTS

| DE | 2603716 | 12/1976 |
|---|---|---|
| EP | 0774219 | 12/1997 |

(Continued)

OTHER PUBLICATIONS

[online] [retrieved on Jan. 22, 2013] [retrieved from Foot Science Limited website] (pdf) http://www.tootscience.com/products_foot.html.

(Continued)

*Primary Examiner* — Sharon M Prange
(74) *Attorney, Agent, or Firm* — Hemingway & Hansen, LLP; D. Scott Hemingway

(57) ABSTRACT

An insole which provides cushioning and support to a user's foot subjected to a high magnitude of ground reaction forces (GRF) encountered in playing court sports, such as basketball, is herein disclosed. The insole comprises a base having a bottom side which defines recesses adapted to receive pads having particular properties. The location and materials of the various pads and pods work together to provide ground (Continued)

reaction force modulation to the user's foot which is highly desirable for users engaged in basketball and similar activities.

28 Claims, 9 Drawing Sheets

(51) Int. Cl.
  *A43B 13/40* (2006.01)
  *A43B 17/00* (2006.01)
  *A43B 17/14* (2006.01)
  *A43B 5/00* (2006.01)
  *A43B 7/32* (2006.01)
  *A43B 13/16* (2006.01)
  *A43B 13/18* (2006.01)
  *B29D 35/14* (2010.01)

(52) U.S. Cl.
  CPC .............. *A43B 7/144* (2013.01); *A43B 7/145* (2013.01); *A43B 7/148* (2013.01); *A43B 7/1425* (2013.01); *A43B 7/1435* (2013.01); *A43B 7/1445* (2013.01); *A43B 7/32* (2013.01); *A43B 13/16* (2013.01); *A43B 13/188* (2013.01); *A43B 13/40* (2013.01); *A43B 17/006* (2013.01); *A43B 17/14* (2013.01); *B29D 35/142* (2013.01)

(58) Field of Classification Search
  CPC ....... A43B 7/145; A43B 7/148; A43B 13/383; A43B 13/40; A43B 17/00; A43B 17/006; A43B 17/14
  USPC ............................................. 36/43, 44, 145
  See application file for complete search history.

(56) References Cited

U.S. PATENT DOCUMENTS

| | | |
|---|---|---|
| 892,360 A | 6/1908 | Burns |
| 1,559,324 A | 10/1925 | Jensen |
| 1,693,122 A | 11/1928 | Schwartz |
| 1,718,906 A | 6/1929 | Hurley |
| 1,811,641 A | 6/1931 | Marcelle |
| 1,861,969 A | 6/1932 | Leighton, Jr. |
| 1,920,112 A | 7/1933 | Shaft |
| 1,945,780 A | 2/1934 | Johnson |
| 2,031,510 A | 2/1936 | Stewart et al. |
| 2,045,844 A | 6/1936 | Everston |
| 2,055,574 A | 9/1936 | Hartl |
| 2,090,881 A | 8/1937 | Wilson |
| 2,207,437 A | 7/1940 | Marks et al. |
| 2,224,590 A | 12/1940 | Boivin |
| 2,224,642 A | 12/1940 | Burns |
| 2,284,947 A | 6/1942 | Clifford |
| 2,347,207 A | 4/1944 | Margolin |
| 2,408,564 A | 10/1946 | Lea |
| D149,889 S | 6/1948 | Layboit |
| 2,502,774 A | 4/1950 | Alianiello |
| 2,553,616 A | 5/1951 | Walls |
| 2,790,254 A | 4/1957 | Burns |
| 2,827,050 A | 3/1958 | Fisher |
| 2,857,689 A | 10/1958 | Van Ostrom et al. |
| 2,985,971 A | 5/1961 | Murawski |
| 3,084,695 A * | 4/1963 | O'Donnell ............. A43B 7/142 36/174 |
| 3,154,867 A | 11/1964 | Strope |
| 3,475,836 A | 11/1969 | Brahm |
| 3,922,801 A | 12/1975 | Zente |
| D243,642 S | 3/1977 | Voorhees |
| 4,020,570 A | 5/1977 | Shames |
| 4,033,054 A | 7/1977 | Fukuoka |
| D246,486 S | 11/1977 | Nickel |
| 4,071,963 A | 2/1978 | Fukuoka |
| 4,108,928 A | 8/1978 | Swan, Jr. |
| 4,123,855 A | 11/1978 | Thedford |
| 4,139,337 A | 2/1979 | David et al. |
| 4,150,455 A | 4/1979 | Fukuoka |
| 4,179,826 A | 12/1979 | Davidson |
| 4,215,492 A | 8/1980 | Sandmeier |
| 4,219,945 A | 9/1980 | Rudy |
| 4,223,457 A | 9/1980 | Borgeas |
| 4,229,546 A | 10/1980 | Swan, Jr. |
| 4,237,626 A | 12/1980 | Brown |
| 4,263,728 A | 4/1981 | Frecentese |
| 4,309,831 A | 1/1982 | Pritt |
| 4,316,332 A | 2/1982 | Giese et al. |
| 4,325,380 A | 4/1982 | Malkin |
| 4,346,205 A | 8/1982 | Hiles |
| 4,346,525 A | 8/1982 | Larsen et al. |
| 4,364,188 A | 12/1982 | Turner et al. |
| 4,408,402 A | 10/1983 | Looney |
| 4,413,429 A | 11/1983 | Power |
| 4,435,910 A * | 3/1984 | Marc ....................... A43B 5/06 36/173 |
| 4,453,322 A | 6/1984 | Marsh |
| 1,541,186 A | 9/1985 | Mulvihill |
| 4,541,184 A | 9/1985 | Leighton |
| 4,546,555 A | 10/1985 | Spademan |
| 4,557,060 A | 12/1985 | Kawashima |
| 4,581,187 A | 4/1986 | Sullivan et al. |
| 4,584,782 A | 4/1986 | Thatcher |
| 4,616,430 A | 10/1986 | McQuiggin |
| 4,619,056 A | 10/1986 | Lin et al. |
| 4,627,178 A | 12/1986 | Sullivan et al. |
| 4,627,179 A | 12/1986 | McElroy |
| 4,633,597 A | 1/1987 | Shiang |
| 4,633,598 A | 1/1987 | Moronaga et al. |
| 4,633,877 A | 1/1987 | Pendergast |
| D288,383 S | 2/1987 | Autry |
| 4,674,204 A | 6/1987 | Sullivan et al. |
| 4,694,589 A | 9/1987 | Sullivan et al. |
| 4,694,831 A | 9/1987 | Seltzer |
| 4,729,179 A | 3/1988 | Quist, Jr. |
| D295,690 S | 5/1988 | Finn |
| D299,583 S | 1/1989 | Tong et al. |
| 4,800,657 A | 1/1989 | Brown |
| 4,813,160 A | 3/1989 | Kuznetz |
| 4,860,463 A | 8/1989 | Pin |
| 4,864,736 A | 9/1989 | Bierk |
| 4,864,740 A | 9/1989 | Oakley |
| 4,876,758 A | 10/1989 | Rolloff et al. |
| 4,887,368 A | 12/1989 | Latzke |
| 4,888,841 A | 12/1989 | Cumberland |
| 4,888,887 A | 12/1989 | Solow |
| 4,928,404 A | 5/1990 | Scheuermann |
| D311,269 S | 10/1990 | Graham et al. |
| 4,974,342 A | 12/1990 | Nakamura |
| 5,010,661 A | 4/1991 | Chu |
| 5,014,706 A * | 5/1991 | Philipp ................. A43B 7/141 36/140 |
| 5,025,573 A | 6/1991 | Giese et al. |
| 5,025,575 A | 6/1991 | Lakic |
| 5,027,461 A | 7/1991 | Cumberland |
| 5,035,068 A | 7/1991 | Biasi |
| D319,919 S | 9/1991 | Niarhos |
| D324,761 S | 3/1992 | Soo-Kwan |
| 5,092,060 A | 3/1992 | Frachey et al. |
| 5,138,775 A | 8/1992 | Chu |
| 5,155,927 A | 10/1992 | Bates et al. |
| 5,184,409 A | 2/1993 | Brown |
| 5,197,207 A | 3/1993 | Shorten |
| 5,201,125 A | 4/1993 | Shorten |
| D336,718 S | 6/1993 | Schroer, Jr. |
| 5,224,277 A | 7/1993 | Sang Do |
| 5,233,767 A | 8/1993 | Kramer |
| D342,374 S | 12/1993 | Wang |
| 5,282,324 A | 2/1994 | Cheng |
| D346,480 S | 5/1994 | Davidson |
| D348,146 S | 6/1994 | Nakano |
| D349,393 S | 8/1994 | Mishan |
| D350,432 S | 9/1994 | Saez |
| D350,848 S | 9/1994 | Tzenos |

(56) References Cited

U.S. PATENT DOCUMENTS

| | | | |
|---|---|---|---|
| 5,367,791 A | 11/1994 | Gross et al. | |
| D353,710 S | 12/1994 | Brazzell | |
| 5,369,896 A | 12/1994 | Frachey et al. | |
| 5,375,346 A | 12/1994 | Cole et al. | |
| 5,400,526 A | 3/1995 | Sessa | |
| 5,400,528 A | 3/1995 | Skinner et al. | |
| 5,408,761 A | 4/1995 | Gazzano | |
| 5,430,960 A | 7/1995 | Richardson | |
| 5,438,768 A | 8/1995 | Bauerfeind | |
| 5,443,529 A | 8/1995 | Phillips | |
| 5,467,536 A | 11/1995 | Ramer et al. | |
| 5,493,791 A | 2/1996 | Kramer | |
| D367,953 S | 3/1996 | King | |
| 5,509,938 A | 4/1996 | Phillips | |
| 5,524,364 A | 6/1996 | Cole et al. | |
| 5,545,463 A | 8/1996 | Schmidt et al. | |
| D374,549 S | 10/1996 | McDonald | |
| 5,615,496 A | 4/1997 | Sharpstein | |
| 5,619,809 A | 4/1997 | Sessa | |
| 5,625,964 A * | 5/1997 | Lyden | A43B 13/20 36/114 |
| 5,640,779 A | 6/1997 | Rolloff et al. | |
| D380,290 S | 7/1997 | Nakagawa | |
| D383,894 S | 9/1997 | Snyder et al. | |
| 5,669,162 A | 9/1997 | Dyer | |
| D384,797 S | 10/1997 | Nakagawa | |
| 5,675,914 A | 10/1997 | Cintron | |
| 5,678,328 A | 10/1997 | Schmidt et al. | |
| 5,685,094 A | 11/1997 | Lin | |
| D388,947 S | 1/1998 | Sessa | |
| D389,296 S | 1/1998 | Sessa | |
| D389,996 S | 2/1998 | Sessa | |
| 5,714,098 A | 2/1998 | Potter | |
| 5,722,186 A | 3/1998 | Brown | |
| 5,732,481 A | 3/1998 | Farhad | |
| 5,771,606 A | 6/1998 | Litchfield et al. | |
| 5,775,005 A | 7/1998 | McClelland | |
| D396,948 S | 8/1998 | Moore et al. | |
| 5,802,737 A | 9/1998 | Beppu | |
| D399,042 S | 10/1998 | Strawser et al. | |
| 5,846,063 A | 12/1998 | Lakic | |
| 5,852,885 A | 12/1998 | Ferniani | |
| D403,847 S | 1/1999 | Blythe | |
| 5,879,725 A | 3/1999 | Potter | |
| D411,759 S | 7/1999 | Byrd | |
| D418,666 S | 1/2000 | Brown | |
| D420,210 S | 2/2000 | Allen | |
| D420,788 S | 2/2000 | Kitagawa | |
| 6,029,372 A | 2/2000 | Pan | |
| D423,765 S | 5/2000 | Autry | |
| D425,690 S | 5/2000 | Bray et al. | |
| D426,118 S | 6/2000 | Thomas | |
| 6,070,342 A | 6/2000 | Brown | |
| 6,079,123 A | 6/2000 | Clark | |
| D428,689 S | 8/2000 | Guiotto et al. | |
| D429,063 S | 8/2000 | Rose | |
| 6,105,283 A | 8/2000 | Park | |
| D432,769 S | 10/2000 | Yung et al. | |
| 6,151,801 A | 11/2000 | Frederiksen et al. | |
| 6,176,025 B1 * | 1/2001 | Patterson | A43B 5/001 36/28 |
| D441,947 S | 5/2001 | Escobar et al. | |
| 6,233,847 B1 | 5/2001 | Brown | |
| D448,542 S | 10/2001 | Bryant | |
| 6,301,805 B1 | 10/2001 | Howlett et al. | |
| D456,128 S | 4/2002 | Evans et al. | |
| D460,854 S | 7/2002 | Hung | |
| 6,425,195 B1 | 7/2002 | Donzis | |
| 6,453,578 B1 | 9/2002 | Yung et al. | |
| D465,079 S | 11/2002 | Merceron | |
| 6,481,120 B1 | 11/2002 | Xia et al. | |
| 6,497,057 B1 | 12/2002 | Lee et al. | |
| 6,502,330 B1 | 1/2003 | David et al. | |
| 6,510,626 B1 | 1/2003 | Greenawalt | |
| 6,519,874 B1 | 2/2003 | Dean | |
| D471,001 S | 3/2003 | Beck | |
| 6,553,690 B2 | 4/2003 | Di Girolamo | |
| D474,331 S | 5/2003 | Dean | |
| D474,588 S | 5/2003 | Dean | |
| D474,881 S | 5/2003 | Su | |
| D475,844 S | 6/2003 | Reynolds et al. | |
| 6,581,303 B1 | 6/2003 | Tuan | |
| 6,598,319 B2 | 7/2003 | Hardt | |
| 6,618,960 B2 | 9/2003 | Brown | |
| 6,631,568 B2 | 10/2003 | Howlett et al. | |
| D485,425 S | 1/2004 | Polifroni | |
| D485,426 S | 1/2004 | Di Girolamo | |
| 6,671,979 B2 | 1/2004 | Cardarelli | |
| 6,684,532 B2 | 2/2004 | Greene et al. | |
| D489,520 S | 5/2004 | Matis et al. | |
| D495,123 S | 8/2004 | Wakatake | |
| D497,473 S | 10/2004 | Martinez | |
| D497,708 S | 11/2004 | Granger et al. | |
| D500,914 S | 1/2005 | Ammon | |
| 6,880,266 B2 | 4/2005 | Schoenborn et al. | |
| 6,915,598 B2 | 7/2005 | Grisoni et al. | |
| 6,959,505 B2 | 11/2005 | Poe | |
| 6,967,044 B1 | 11/2005 | O'Brien | |
| 7,082,702 B2 | 8/2006 | Cretinon | |
| 7,107,705 B2 * | 9/2006 | Dalton | A43B 7/142 36/28 |
| D529,691 S | 10/2006 | Earle | |
| D543,685 S | 6/2007 | Andersen et al. | |
| 7,284,342 B2 | 10/2007 | Avent et al. | |
| 7,316,081 B1 | 1/2008 | Cheng | |
| D563,649 S | 3/2008 | Andersen et al. | |
| D576,391 S | 9/2008 | Contreras | |
| D576,394 S | 9/2008 | Heller | |
| 7,437,836 B2 | 10/2008 | Kim | |
| D584,885 S | 1/2009 | Contreras | |
| 7,484,319 B2 | 2/2009 | Cheskin et al. | |
| D592,386 S | 5/2009 | Baker et al. | |
| D593,742 S | 6/2009 | Issler | |
| D594,640 S | 6/2009 | McMillan | |
| D596,833 S | 7/2009 | Dominquez et al. | |
| 7,665,169 B2 | 2/2010 | Cheskin et al. | |
| 7,712,229 B2 | 5/2010 | Yang | |
| D617,086 S | 6/2010 | Avent et al. | |
| D617,087 S | 6/2010 | Avent et al. | |
| D634,924 S | 3/2011 | Cheskin et al. | |
| 7,900,380 B2 | 3/2011 | Rich | |
| 7,908,768 B2 * | 3/2011 | Cheskin | A43B 7/141 36/144 |
| D656,716 S | 4/2012 | Eades | |
| 8,186,081 B2 | 5/2012 | Wilson, III et al. | |
| 8,241,450 B2 | 8/2012 | Hensley et al. | |
| 8,490,297 B2 * | 7/2013 | Guerra | A43B 7/1425 36/28 |
| 8,745,894 B2 * | 6/2014 | Cheskin | A43B 1/0009 36/3 R |
| 2001/0000369 A1 | 4/2001 | Snyder et al. | |
| 2002/0050080 A1 | 5/2002 | Vasyli | |
| 2002/0092203 A1 | 7/2002 | Hardt | |
| 2002/0116840 A1 | 8/2002 | Kraft | |
| 2003/0009915 A1 | 1/2003 | Bacon | |
| 2003/0024134 A1 | 2/2003 | Howlett et al. | |
| 2003/0070321 A1 | 4/2003 | Davis et al. | |
| 2003/0093920 A1 | 5/2003 | Greene et al. | |
| 2003/0121180 A1 | 7/2003 | Poe | |
| 2003/0150134 A1 | 8/2003 | Hardt | |
| 2004/0025374 A1 | 2/2004 | Basso | |
| 2004/0118017 A1 | 6/2004 | Dalton et al. | |
| 2004/0194344 A1 | 10/2004 | Tadin | |
| 2005/0138847 A1 | 6/2005 | Blackburn et al. | |
| 2005/0262736 A1 | 12/2005 | Peoples | |
| 2006/0016099 A1 | 1/2006 | Marco et al. | |
| 2006/0026779 A1 | 2/2006 | Berg et al. | |
| 2006/0096124 A1 | 5/2006 | Moseley | |
| 2006/0123664 A1 | 6/2006 | Boyd et al. | |
| 2006/0130367 A1 | 6/2006 | Liu | |
| 2006/0168846 A1 | 8/2006 | Juan | |
| 2006/0230643 A1 | 10/2006 | Affleck | |
| 2006/0254088 A1 | 11/2006 | McCormick | |
| 2007/0033834 A1 | 2/2007 | Cheskin et al. | |

(56) References Cited

U.S. PATENT DOCUMENTS

| | | |
|---|---|---|
| 2007/0039209 A1 | 2/2007 | White |
| 2007/0245592 A1 | 10/2007 | Yamaguchi et al. |
| 2007/0261268 A1 | 11/2007 | Nguyen |
| 2008/0028637 A1 | 2/2008 | Benfatti |
| 2008/0110060 A1 | 5/2008 | Ritter |
| 2008/0271340 A1 | 11/2008 | Grisoni et al. |
| 2009/0049712 A1 | 2/2009 | Steszyn et al. |
| 2009/0100722 A1 | 4/2009 | Hoffer et al. |
| 2009/0151194 A1 | 6/2009 | Cheskin et al. |
| 2009/0249650 A1 | 10/2009 | Sarantakos |
| 2010/0015869 A1 | 1/2010 | Hartmann et al. |
| 2010/0083534 A1 | 4/2010 | Howlett |
| 2010/0095552 A1 | 4/2010 | Cheskin et al. |
| 2010/0126044 A1 | 5/2010 | Davis |
| 2010/0170116 A1 | 7/2010 | Shim |
| 2010/0205831 A1 | 8/2010 | Cheskin et al. |
| 2010/0218398 A1 | 9/2010 | Reinhardt et al. |
| 2010/0251577 A1 | 10/2010 | Yamada |
| 2011/0072685 A1* | 3/2011 | Gutowsky, Jr. ........ A43B 7/142 36/44 |
| 2011/0131835 A1 | 6/2011 | Cheskin |
| 2011/0179672 A1* | 7/2011 | Cheng .................... A43B 7/141 36/71 |
| 2011/0209360 A1 | 9/2011 | Baker et al. |
| 2011/0219642 A1 | 9/2011 | Sulak et al. |
| 2011/0232129 A1 | 9/2011 | Roberts et al. |
| 2011/0252671 A1 | 10/2011 | Maron et al. |
| 2011/0302805 A1 | 12/2011 | Vito |
| 2013/0074366 A1* | 3/2013 | Yeh ...................... A43B 7/1405 36/44 |
| 2013/0160331 A1 | 6/2013 | Burke |

FOREIGN PATENT DOCUMENTS

| | | |
|---|---|---|
| KR | 20-1993-002480 | 5/1992 |
| KR | 10-0641278 | 10/2006 |
| KR | 10-0736813 | 7/2007 |
| KR | 10-0780086 | 11/2007 |
| LR | KR 20-0427687 | 4/2006 |
| WO | WO 2004060095 | 7/2004 |
| WO | WO 2006035469 | 4/2006 |
| WO | WO 2006090398 | 8/2006 |
| WO | WO 2007021328 | 2/2007 |
| WO | WO 2007056101 | 5/2007 |
| WO | WO 2009126111 | 10/2009 |

OTHER PUBLICATIONS

[online] [retrieved on Jan. 22 , 2013] [retrieved from geldoctor website] (pdf) http://www.geldoctor.com/flosole.html.

[online] [retrieved on Jan. 22, 2013] [retrieved from Gerbing's website] (pdf) http://www.gerbing.com/Products/insoles.php.

[online] [retrieved on Jan. 22, 2013] [retrieved from Heat Factory website] (pdf) http://www.heatfactory.com/english/product.pht?cat=3&id.

[online] [retrieved on Jan. 22, 2013] [retrieved from Dr. Rosenberg's Foot Products website] (pdf) http://www.instantarches.com/cool-soles.shtml.

[online] [retrieved on Jan. 22, 2013] [retrieved from Mean and Green website]web page] (pdf) http://www.meanandgreen.com/army/-Thermal-Foil_insoles/2660/2303.html.

[online] [retrieved on Jan. 22, 2013] [retrieved from Superfeet website] (pef) http://www.superfeet.com/products/REDHot.aspx.

[online] [retrieved on Jan. 22, 2013] [retrieved from Thermo Soles website] (pdf) http://www.thermosoles.com/

[online] [retreived on Jan. 22, 2014] [retreived from Warmers.com website] (pdf) http://www.warmers.com/grabber-got-warmers-medium-5-hour-10pr-bundle.

PCT, International Search Report & Written Opinion of the International Searching Authority for PCT/US2013/026932. dated Jun. 18, 2013.

PCT, International Search Report & Written Opinion of the International Searching Authority for Counterpart International Patent Application No. PCT/US2006/014681. dated Jul. 27, 2006

PCT, International Search Report & Written Opinon of the International Searching Authority for Counterpart International Pataent Application No. PCT/US2013/057141. Nov. 12, 2013.

PCT, International Search Report & Written Opinon of the International Searching Authority for Counterpart International Patent Application No. PCT/US2014/055133. dated Jan. 15, 2015.

PCT, International Search Report and Written Opinon of the International Searching Authority for Counterpart International Patent Application No. PCT/US2006/042885. dated Mar. 13, 2007.

* cited by examiner

BASKETBALL INSOLE

RELATED APPLICATION DATA

This application claims the benefit of U.S. Provisional Application No. 61/710,426, filed Oct. 5, 2012, and U.S. Provisional Application No. 61/696,050, filed Aug. 31, 2012.

TECHNICAL FIELD

The present invention relates to a shoe insole with improved cushioning and support to the foot of a wearer engaging in basketball or similar sports.

BACKGROUND OF THE INVENTION

The human foot is a very complex biological mechanism. The many bones, muscles, ligaments, and tendons of the foot function to absorb and dissipate the forces of impact. In the course of engaging in sports such as basketball, a participant's foot undertakes positions or is subject to force that it does not undertake or is not made subject to in normal walking activities.

Insoles which are placed inside shoes have been available and various designs disclosed which offer cushioning and support to the foot.

In 2007, Yu et al. demonstrated that generic arch support insoles may increase the risk of lateral ankle instability and expose basketball players to specific injuries such as lateral ankle sprains and proximal fractures of the 5th metatarsal. Based on Yu reference, there is a need for insoles with arch supports that promote foot stability.

In a 2001 study of ten 393 basketball participations, McKay concluded that ankle injuries in basketball occur at a rate of around 4 per 1000 participants, with almost half (45%) missing 1-week or more of competition. The authors also discovered that players wearing shoes incorporating air cells in the heels were 4.3 times more likely to injure an ankle than those with firmer soles demonstrating the importance of the direction and magnitude of ground reaction force (GRF) in the incidence of ankle sprains. Based on the McKay study, there is a need for an insole that modulates the direction and magnitude of the GRFs.

In 2010, Waterman, et al queried the National Electronic Injury Surveillance System (NEISS) for all ankle sprain injuries presenting to emergency departments between 2002 and 2006. Incidence rate ratios were then calculated with respect to age, sex, race, and sport. They found that nearly half of all ankle sprains (49.3%) occurred during athletic activity, with basketball (41.1%), football (9.3%), and soccer (7.9%) being associated with the highest percentage of ankle sprains during athletics. Based on the Waterman study, there is a need for an insole that modulates the direction and magnitude of the GRFs.

In 1993, Dananberg described how a functional limitation of hallux dorsiflexion during the propulsive phase of gait may be the primary aetiology of chronic postural pain. Other authors have proposed Functional Hallux Limitus (FHL) as the primary aetiology of heel pain, lesser metatarsal pain, Morton's neuroma, Achilles tendonitis and enthesitis, posterior tibial tendon dysfunction, and postural alignment abnormalities of the lower extremity and lumbar spine. The incidence of FHL is difficult to determine, although Payne et al. identified the condition in 53 of 86 asymptomatic feet. Therefore, it is reasonable to assume that FHL is common among the general population and is a risk factor for postural pain and injury. It is also reasonable to conclude that if hallux dorsiflexion is functionally restricted, the efficiency of the propulsive phase of the running gait cycle and vertical jumps will be adversely affected. Based on the Dananberg (and related studies), there is a need for an insole that encourages first metatarsal plantarflexion and hallux dorsiflexion during the propulsive phase of gait.

The Applicant has received patents for insoles having a stability cradle and multiple pods located thereon. These patents include U.S. Pat. Nos. 7,484,319, 7,665,169, 7,908,768 and 8,250,784. These patents, however, do not address or counter the GRF forces with maximum efficiency, and as such, there is a need for an invention that more efficiently and effectively addresses those GRF forces and related problems associated with those forces, provides an improved reduction of risk for ankle sprains, and encourage a more efficient propulsive phase during running and jumping.

Also, there is a present need for a shoe insole that accomplishes the goals to: (1) reduce the common occurrence of ankle sprains or roll-overs, (2) enhance the efficiency of the propulsive phase or running and vertical jumps, (3) cushion the heel and forefoot during push-offs and landings, (4) reduce friction on the plantar forefoot during pivoting and high velocity stops and starts, (5) offer graduated support to the arch without restricting first-ray plantarflexion for active propulsion, nor the pronation motion required for extreme cutting, (6) custom-contour to the inside shape of all basketball boots, and (7) be extremely light.

SUMMARY OF THE INVENTION

An insole which provides cushioning and support to a user's foot subjected to the forces encountered in playing court sports, such as basketball, is herein disclosed. The insole of the invention generates lateral ground reactive forces (GRF), which help prevent lateral ankle roll-overs, one of the most common injuries in basketball and other jumping sports. In addition, the insole is designed with structures to provide cushioning and energy return in the areas of the foot exposed to high GRF during jumping and running The structure and materials of the insole are selected to minimize the total weight of the insole without compromising resiliency and durability. The insole of the invention promotes enhanced efficiency of the propulsive phase of walking, running and vertical jumping by providing structures which reduce functional hallux limitus (FHL) and encourage an increase in range of motion at the first metatarsophalangeal joint of a user's foot with FHL.

The current invention is an insole that incorporates, but is not limited to: (1) a soft spot beneath the first metatarsal head with firmer support beneath the lesser metatarsal heads to encourage first metatarsal plantarflexion during the propulsive phase of gait, (2) support beneath the hallux to encourage hallux dorsiflexion, and (3) a graduated arch support with a soft area beneath the shaft of the first metatarsal to allow unrestricted first ray plantarflexion during the propulsive phase of gait.

DETAILED DESCRIPTION

Figure 1:
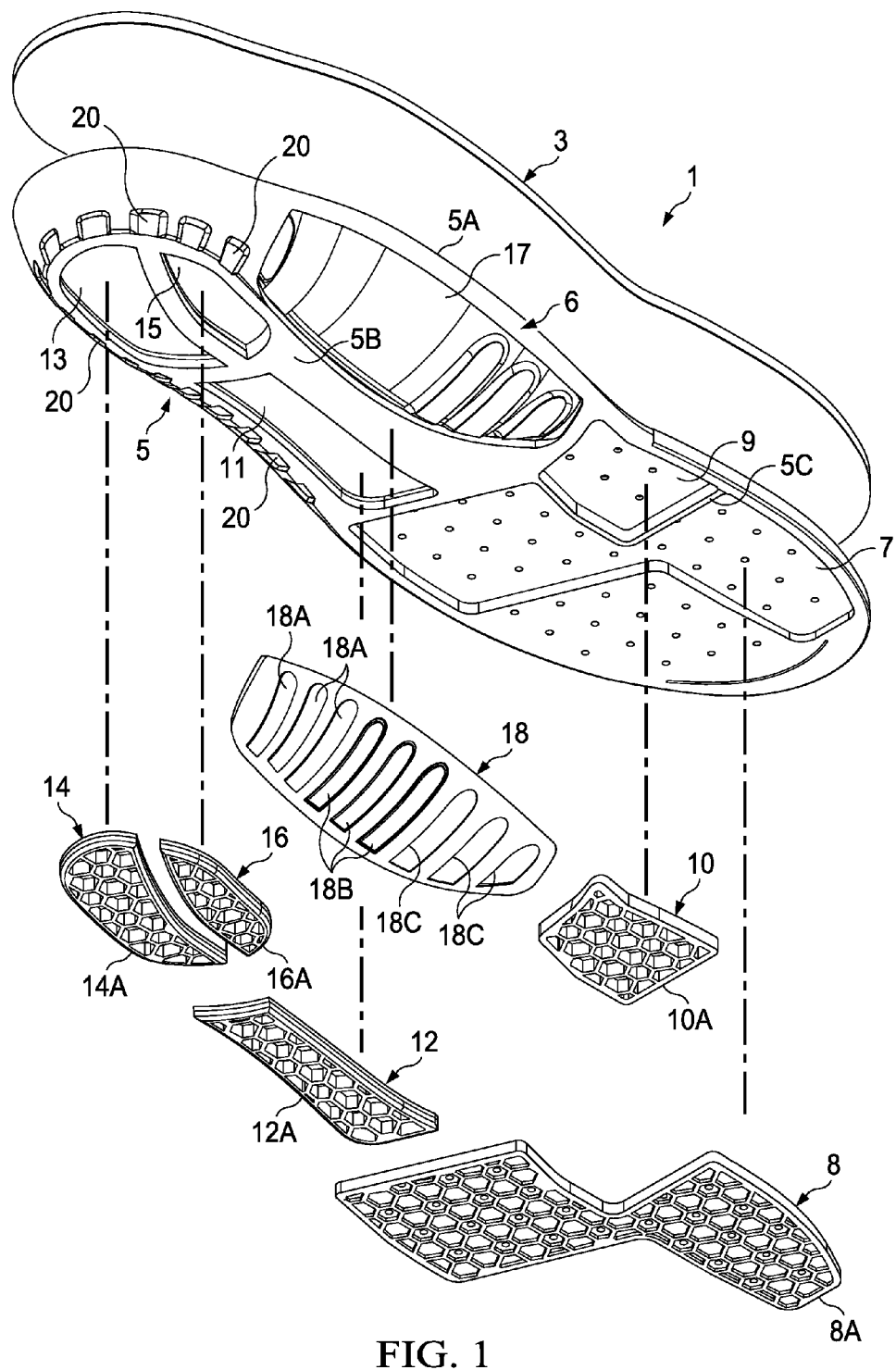
FIG. 1 is a exploded perspective view of an illustrative embodiment of an insole in accordance with the principles of the present invention.

All insoles with a heelcup and a degree of medial longitudinal arch support are likely to provide a modicum (a couple of degrees) of pronation "control." A degree of medical longitudinal and support is just a couple of degrees based on research evidence. By pronation "control," we mean the increase in supination moments acting around the joints of the rearfoot and decrease the magnitude of pronation moments).

A number of respected researchers have proposed that kinematic changes in foot function may not be the primary pathway through which musculoskeletal aches, pains, and chronic injuries improve with the use of insoles. The present insole invention disclosed herein is a replacement insole primarily designed to function kinetically to reduce the risk of ankle sprains and to encourage a more efficient propulsive phase during running and jumping for players of all levels in basketball and/or other sports.

An insole which provides cushioning and support to a user's foot subjected to the forces encountered in playing court sports, such as basketball, is herein disclosed. Ground reactive force (GRF) is encountered when a user's foot contacts the ground. A high magnitude of GRF is encountered in court sports. The insole of the invention generates lateral GRF, which help prevent lateral ankle roll-overs, one of the most common injuries in basketball and other jumping sports. In addition, the insole is designed with structures to provide cushioning and energy return in the areas of the foot exposed to high GRF during jumping and running. The structure and materials of the insole are selected to minimize the total weight of the insole without compromising resiliency and durability. The insole of the invention promotes enhanced efficiency of the propulsive phase of walking, running and vertical jumping by providing structures which reduce functional hallux limitus (FHL) and encourage an increase in range of motion at the first metatarsophalangeal joint of a user's foot with FHL. This joint is one of the primary lever systems of the foot responsible for active propulsion.

Some of the goals of the present invention is to (1) reduce the common occurrence of ankle sprains or roll-overs, (2) enhance the efficiency of the propulsive phase or running and vertical jumps, (3) cushion the heel and forefoot during push-offs and landings, (4) reduce friction on the plantar forefoot during pivoting and high velocity stops and starts, (5) offer graduated support to the arch without restricting first-ray plantarflexion for active propulsion, nor the pronation motion required for extreme cutting, (6) custom-contour to the inside shape of all basketball boots, and (7) be extremely light.

The current invention is an insole that incorporates, but is not limited to: (1) a soft spot beneath the first metatarsal head with firmer support beneath the lesser metatarsal heads to encourage first metatarsal plantarflexion during the propulsive phase of gait, (2) support beneath the hallux to encourage hallux dorsiflexion, and (3) a graduated arch support with a soft area beneath the shaft of the first metatarsal to allow unrestricted first ray plantarflexion during the propulsive phase of gait. The present invention accomplishes the goals to: (1) reduce the common occurrence of ankle sprains or roll-overs, (2) enhance the efficiency of the propulsive phase or running and vertical jumps, (3) cushion the heel and forefoot during push-offs and landings, (4) reduce friction on the plantar forefoot during pivoting and high velocity stops and starts, (5) offer graduated support to the arch without restricting first-ray plantarflexion for active propulsion, nor the pronation motion required for extreme cutting, (6) custom-contour to the inside shape of all basketball boots, and (7) be extremely light.

In reference to FIGS. 1 to 12, an insole constructed in accordance with the principles of the present invention is disclosed. It should be understood that insoles are generally adapted to be inserted inside a user's shoe. A user's right shoe and left shoe are mirror images of one another as are the insoles adapted to be inserted in a right shoe and a left shoe respectively. Only the left insole is illustrated in the Figures. It will be understood by those of skill in the art that the right insole has a mirror image construction of the left insole.

The insole of the invention is shaped essentially like the bottom interior of an athletic shoe (and therefore adapted to receive a user's foot which has a generally similar shape when at rest). The insole extends from a heel end (proximal) to a toe end (distal) and has a medial border or side on the arch side of the foot, connecting said toe end to said heel end along the arch side of the insole and a lateral border or side on the other side thereof, connecting said toe end to said heel end on the other side of the insole. The insole also has a forefoot area (area that correlates with the metatarsal and phalanges of the foot), an arch area (along the medial side), a heel area (just forward of the heel end), and a midfoot area (between the heel area and forefoot area).

Figure 3:
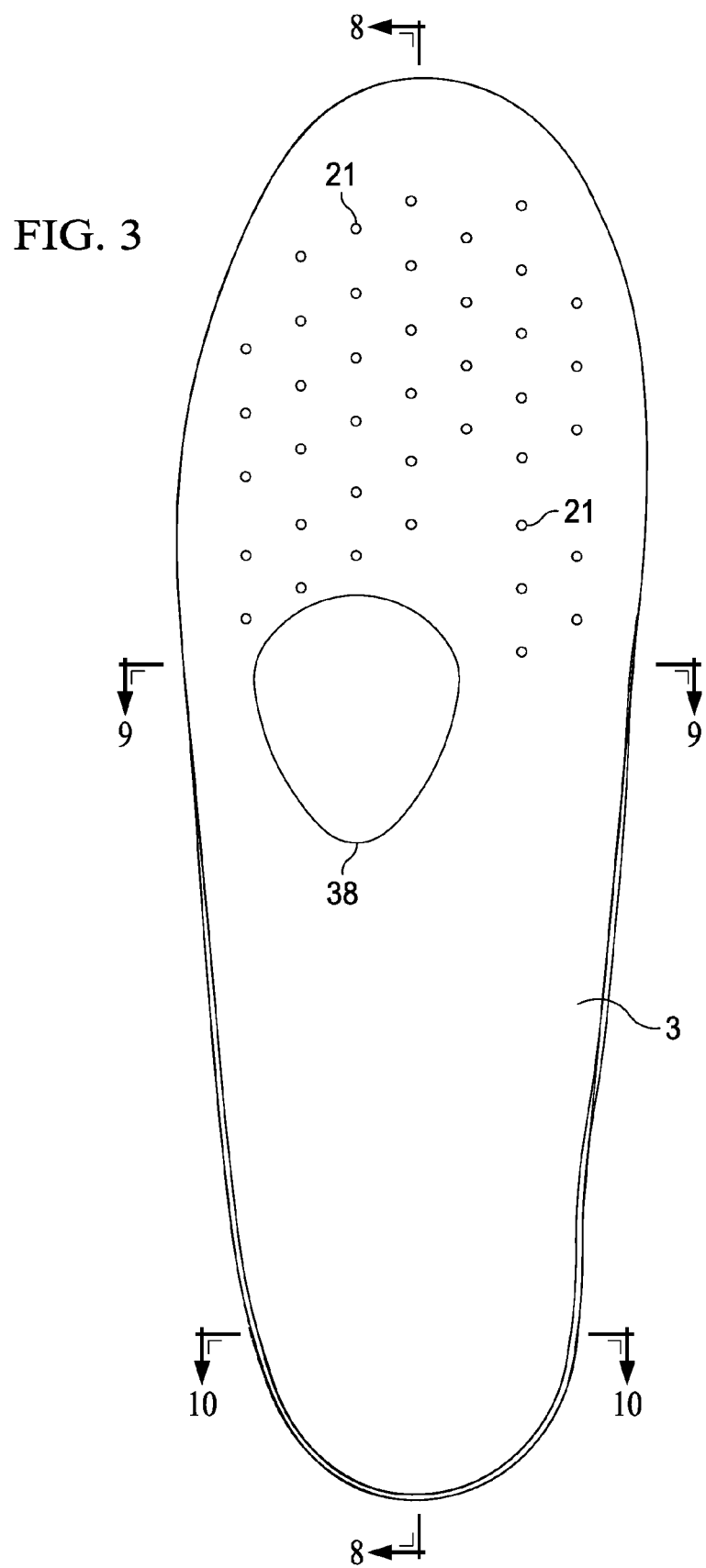
FIG. 3 is a top view of the insole.
Figure 9:
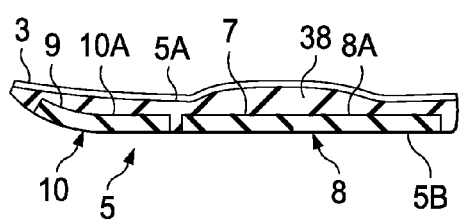
FIG. 9 is a transverse cross sectional view behind the metatarsal area of the insole of FIG. 1.
Figure 8:
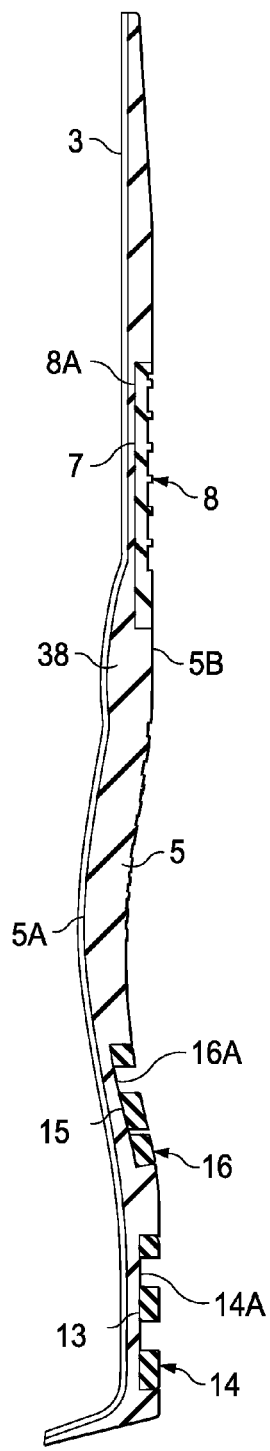
FIG. 8 is a longitudinal cross sectional view of the insole.

As shown in the exploded view of FIG. 1, insole 1 preferably comprises a top sheet 3 and a base 5 having a top surface 5A secured to said top sheet and an opposite bottom surface 5B. Preferably, said top surface 5A of said base layer 5 defines an upwardly-extending portion or metatarsal dome 38 (as shown in FIGS. 3, 8 and 9) that lies under the metatarsal head area of the foot. Base 5 also defines a longitudinal arch support 6 that extends upwardly along the medial side of the insole to provide extra cushion and support to the arch area of the foot.

The bottom surface 5B of base 5 defines a forefoot pad recession area 7 in the forefoot area, a first metatarsal head pad recession area 9 in the area of the first metatarsal, a lateral midfoot pod recession area 11 in the middle of the insole near the lateral side, a lateral heel pod recession area 13 in the heel area near the lateral side, a medial heel pod recession area 15 in the heel area near the medial side, and an arch recession area 17 from the middle of the insole towards the heel area near the medial side, Divider 5C may also be employed to help further distinguish the edges of first metatarsal head recess area 9 and forefoot pad recession area 7.

Metatarsal dome 38 preferably lies under the second to fifth metatarsal heads. Metatarsal dome 38 provides a redistribution of pressure away from the lesser metatarsal heads for general forefoot comfort and relatively increases the depth of the first metatarsal head pad recession area 9 to encourage a greater degree of first ray plantarflexion during the propulsive phase of gait.

The forefoot pad recession area 7 begins near the distal end of the insole and extends under the hallux proximally to the front of the first metatarsal head. The forefoot pad recession area 7 then extends laterally and proximally under the lesser metatarsal heads to the back of the metatarsal heads. Forefoot pad recession area 7 in essence fully surrounds the distal and lateral sides of the first metatarsal head pad 10.

Figure 11:
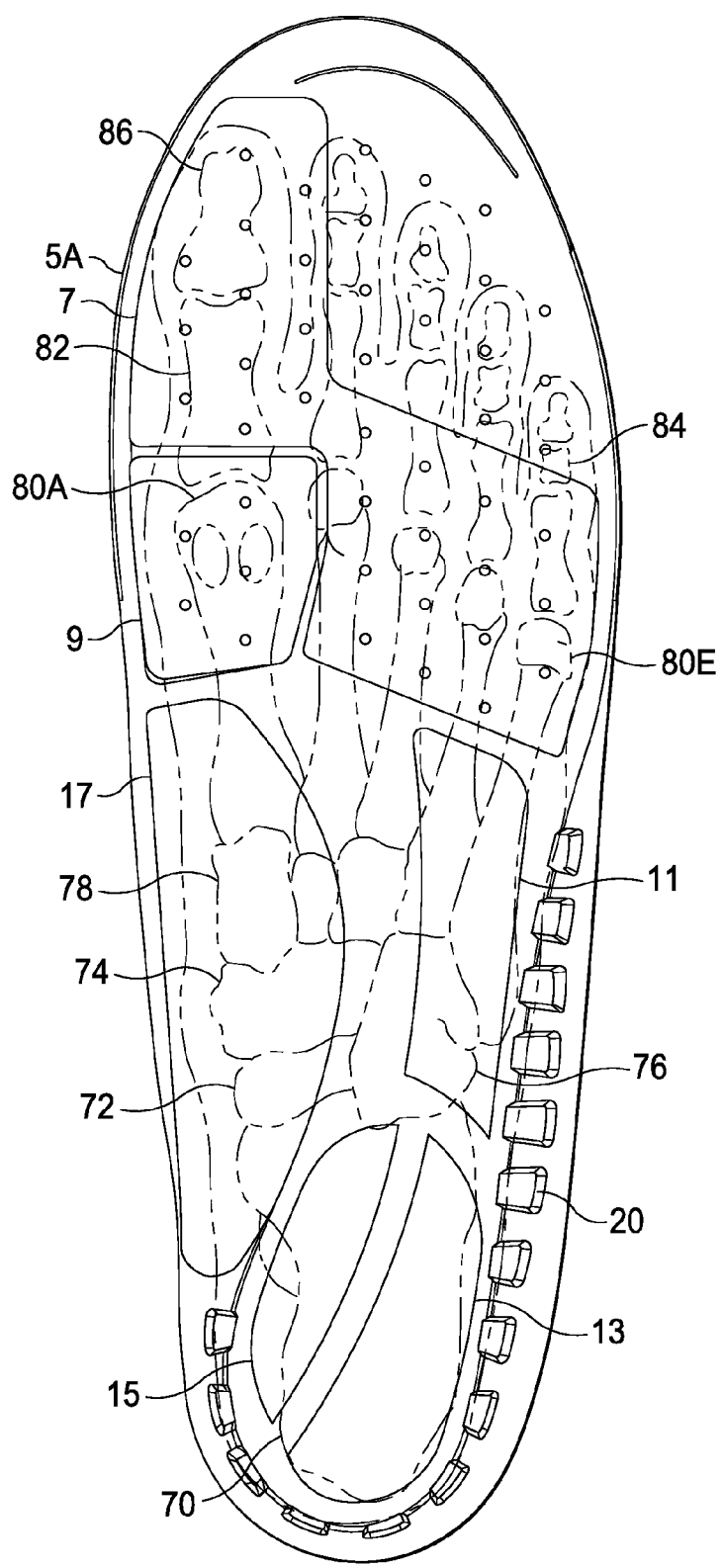
FIG. 11 is a view of the bones of the foot superimposed on a bottom (plantar) view of the insole.

Forefoot pad 8 is shaped essentially the same as forefoot pad recession area 7 and is secured therein. Forefoot pad 8 has a medial edge, a lateral edge, a proximal (back) edge and a distal (front) edge. The medial edge of forefoot pad 8 extends along a line spaced laterally from said medial border of said insole, essentially extending from near said toe end to the proximal edge of said metatarsal pad area. The proximal edge extends from said medial edge transversely diagonally (or laterally and proximally) to said lateral edge, which is spaced medially from said lateral border of said insole. The lateral edge connects said proximal edge to said top edge of said forefoot pad. In use, forefoot pad recession area 7 and forefoot pad 8 underlie the big toe of a user's foot, and the "ball" of the foot, excluding the first metatarsal head or medial ball of the user's foot. FIG. 11 shows the placement of foot bones on the insole.

The forefoot pad recession area 7 may be lined with a forefoot pad area cloth 8A having a base surface and a pad surface, secured to said base along said base surface and said forefoot pad along said pad surface. Alternatively, a fabric may be secured to forefoot pad 8 and the composite structure secured to forefoot pad recession area 7 and inserted and secured to said forefoot pad recession area 7 by adhesion.

An adhesive may be used to secure the components. The forefoot pad 8 provides cushioning and energy return on landing from a vertical jump. It serves as a propulsion pad beneath the big toe (hallux). The portion of the forefoot pad between the lateral border and the portion underlying the big toe in use serves as a propulsion pad and support for the lesser metatarsal heads of a user's foot.

First metatarsal head pad recession area 9 is a recess in the bottom surface 5B of the base 5 and lies under the first metatarsal head of the foot. First metatarsal head pad 10 is shaped essentially the same as first metatarsal head pad recession area 9 and is secured to first metatarsal head pad recession area 9. A first metatarsal head pad area cloth 10A may be secured to the base layer on one side and the metatarsal pad on the other, similar to that described above in relation to said forefoot pad. Alternatively, a fabric may be instead secured to said metatarsal pad, and the composite structure inserted and secured to said metatarsal pad recession area by adhesion.

In basketball, and other court sports, it is important that the metatarsophalangeal joints between the heads of the metatarsal bones and the bases of the proximal phalanges (toes) of the user's foot are free to dorsiflex, an upward or backward flexion. Forefoot pad 8 and first metatarsal head pad 10 can move independently from one another due to differential in densities. Forefoot pad 8 is preferably firmer than first metatarsal head pad 10. Forefoot pad 8 supports the lesser metatarsal heads and first metatarsal head pad 10 allows the first metatarsal head to depress into a lower position allowing more efficient dorsiflexion of the first toe joint. The area of forefoot pad 8 beneath the great toe adds a slight push up force to also encourage improved big toe joint dorsiflexion. In this manner, forefoot pad 8 may have less density then the first metatarsal head pad 10, depending on the physical characteristics desired and the intended use of the insole by the user. Alternatively, a softer forefoot pad 8 than first metatarsal head pad 10 limits the dorsiflexion of the first toe joint as that may be advantageous in the use of the insole in various activities and physical movements.

Forefoot pad 8 has a different density than the first metatarsal head pad 10 and may have different densities compared to the other pad and pod inserts by using different materials, an open-cell design, or varying the thickness of the forefoot pad 8. The use of different densities on the forefoot pad 8 compared to the first metatarsal head pad 10 increases the performance of the insole in handling lateral force impacts by allowing for improved hallux dorsiflexion.

The open-cell design is preferably a honeycomb-like structure. A greater depth of the open-cell may provide different cushioning and spring properties as it acts more as an air cushion. Additionally, extending said air holes 21 through an open-cell may provide different cushioning and spring properties as it would allow various open-cells to more fully collapse as compared to the surrounding open-cells.

The forefoot pad may be presented as a modified open-cell design. The modified open-cell design provides open-cells that do not extend the entire thickness of the pad or pod with approximately half the thickness of the pad or pod as a solid material and approximately the other half with the open-cell design. This may be advantageous for creating smaller air cushion pockets where less air cushioning resistance is desired.

It is estimated that using tougher materials may increase the durability of the insole by 35% to 65% over insoles that use softer materials for this portion of the foot insole.

In use, first metatarsal head pad 10 remains under the first metatarsal head (i.e., the medial ball of the user's foot) and moves with it. This may also be thought of in terms of reducing the GRF beneath the first metatarsal head. This enhances propulsion of the foot in wearers with FHL. The portion of forefoot pad 8 near the lateral border of the insole concurrently supports the lesser metatarsal heads of the user's foot. When the user dorsiflexes the first metatarsophalangeal joint (the big toe joint), the forefoot pad area near the medial border of the insole in the toe area applies a gentle upwards force to encourage improved dorsiflexion of the first toe joint of the user's foot.

The first metatarsal head pad 10, in shape, is a slightly irregular rectangular or polygonal shape. Preferably, said first metatarsal head pad 10 has an essentially linear distal edge, a slightly curvilinear medial edge which follows the curve of the medial border of the insole, a proximal edge which is curved or angled to follow the shape of the metatarsal edge of longitudinal arch support 6, and a lateral edge which is curvilinear or linear. Preferably, said first metatarsal head pad 10 is about 4.5 mm thick. Thickness gives sufficient initial support but allows for adequate compression once loaded. First metatarsal head pad's 10 basic design is to create differential in support under the metatarsal heads and allow the first metatarsal head to drop below the plane of the other metatarsal heads.

The arch recession area 17 is located along the longitudinal arch support 6 and has a proximal edge end nearest the heel end of the insole and extends toward said toe end of the insole to a distal edge end. Connecting said proximal edge end to said distal edge end is a medial edge and a lateral edge, with said lateral edge having a parabolic-like shape. In general, it approximately lies in the arch area of the foot or under the talus, navicular, first cuneiform, and part of the first metatarsal. Arch support 18 is shaped essentially the same as arch recession area 17 and is secured to said arch recession area 17 on bottom surface 5B of base 5. The arch support 18 defines, from said proximal edge end going toward said distal edge end, a plurality of ribs extending outwardly therefrom (18A), a plurality of essentially level ribs (18B) having a rib outline indented in said arch support, and one or more rib-shaped openings (18C). In a preferred embodiment, three of said plurality of ribs, or extending ribs 18A, extend outwardly from said arch support 18 and are approximately 0.50 mm thick. In a preferred embodiment, three of said essentially level ribs 18B are employed and said rib outline is approximately 0.50 mm deep. In a preferred embodiment, three rib-shaped openings 18C are defined which allow said base 5 to extend therethrough. The width of each rib is approximately 0.5 mm.

Arch support 18 partially wraps up the medial side of base 5 under the medial longitudinal arch. Rib-shaped openings 18C improve flexibility at said distal edge end of arch support 18 without sacrificing longitudinal arch support at the middle and heel end of arch support 18. Preferably, base 5 is molded so that portions of the foam material project into rib-shaped openings 18C so that such portions are approximately flush with the outer surface of arch support 10 and mechanically lock arch support 18 and base 5 together. Advantageously, the foam is also able to bulge through rib-shaped openings 18C when base 5 is compressed (e.g., while walking or running) to provide additional cushioning and support to the arch.

The first three rib-shaped openings 18C in the distal one-third of the arch support 18 are provided to allow the area immediately proximal to the first metatarsal head (i.e., the distal shaft of the first metatarsal) to remain flexible in order to encourage unrestricted plantarflexion of the first ray during the propulsive phase of gait.

The central and proximal two-thirds of the arch support 18 (level ribs 18B and extending ribs 18A) are stiffened by progressively thicker transverse bars to provide improved support to the arch and the application of higher magnitudes of anti-pronation GRF into the area of the sustentaculum tali when the foot moves into a pronated position.

When the foot takes up a "neutral" (i.e., neither pronated or supinated) position, the arch support applies a gentle supination (anti-pronation) moment to subtalar joint (i.e., the rearfoot), while the lateral midfoot pod applies a gentle pronation moment to the forefoot to "stabilize" the midtarsal joint.

When the foot moves into a pronated position, the arch support applies a higher magnitude of GRF against the area beneath the sustentaculum tali (i.e., the proximal arch) increasing the supination (anti-pronation) moment to subtalar joint (i.e., the rearfoot), while a lateral midfoot pod becomes relatively inactive.

When the foot takes up a supinated position that threatens lateral ankle instability and injury, the lateral midfoot pod (and the lateral heel pod, if the heel is also in contact with the ground) increases the magnitude of GRF against the lateral aspect of the foot to create pronation moments that may help to reduce the incidence of ankle sprains.

For a men's size 11-12, the arch support is approximately 110-111 mm long, the preferred width of said proximal edge end of said arch support is about 24 to 25 mm. The width at the widest point, adjacent said essentially level ribs, is about 37.5 to 38.5 mm. The arch support is preferably made from Nylon 66 with a hardness of 95 Shore A.

Lateral midfoot pod recession area 11 extends from the back of the metatarsal heads proximally to the front of the heel area along the lateral side of the bottom surface 5B. Lateral midfoot pod 12 is shaped essentially the same as lateral midfoot pod recession area 11 and is secured to said base in said lateral midfoot pod recession area 11. The lateral midfoot pod 12 has a lateral edge which is adjacent said lateral border of said insole when secured to said lateral midfoot pod recession area 11 of said base 5. The length of the lateral midfoot pod 12 is preferably sufficient to provide cushioning and an increase in GRF to the lateral aspect of the midfoot to help prevent ankle roll-overs.

When the foot moves into a supinated position that threatens lateral ankle instability (usually upon landing), the lateral midfoot pod (and the lateral heel pod, when the heel contacts the ground) increases the magnitude of GRF against the lateral aspect of the foot to create pronation (anti-supination) moments that may help to reduce the incidence of ankle sprains. Alternatively, if the foot moves into a pronated position that threatens medial ankle instability, a medial heel pod may increase the magnitude of GRF against the medial aspect of the foot to create supination (anti-pronation) moments.

Lateral midfoot pod 12 is preferably made from TPR of a hardness of about 49 ASKER C±3 and a fabric 12A to which the TPR is secured. The fabric is in turn secured to the base in the lateral midfoot pod recession area of said base. The fabric 12A component allows the TPR to properly adhere to the base 5.

Lateral heel pod recession area 13 extends through the heel area along the lateral side of heel area on the bottom surface 5B toward the heel end. Lateral heel pod 14 is shaped essentially the same as lateral heel pod recession area 13 and is attached to said lateral heel pod recession area 13 of said insole base 5. Lateral heel pod 14 (and a fabric secured thereto) has a lateral edge which extends along the lateral border of insole 1 from said heel end to a lateral heel edge spaced apart from said lateral midfoot pod. The lateral edge curves in the area of the heel to follow the outline of the insole heel end. The lateral heel pod 14 also has a medial curvilinear edge. The overall configuration is roughly a three-sided geometric shape with curved edges as described rather than straight lines.

The configuration, material and position of the lateral heel pod 14 provides cushioning and, in association with the medial heel pod 16, an increase in GRF to the lateral aspect of the user's heel to help reduce the incidence of lateral ankle roll-overs. The hardness of the lateral heel pod is preferably essentially the same as the lateral midfoot pod, which work in concert to help reduce the incidence of lateral ankle roll-overs. It is preferably made of TPR having an ASKER C value of 50±3. A fabric 14A is in turn secured to the base in the lateral heel pod recession area of said base. The fabric 14A component allows the TPR to properly adhere to the base. Alternatively, the configuration, material and position of the lateral heel pod 14 provides cushioning and, in association with the medial heel pod 16, an increase in GRF to the medial aspect of the user's heel to help reduce the incidence of medial ankle roll-overs.

Due to the properties of the TPR and the open-cell hexagonal honeycomb-like design, the lateral heel pod is likely to reduce the impact transient at heel strike "cushioning" the contact phase of gait.

Medial heel pod recession area 15 extends through the heel area along the medial side of heel area on the bottom surface 5B just short of the heel end. Medial heel pod 16 is shaped essentially the same as medial heel pod recession area 15 and is attached to medial heel pod recession area 15 of said base 5. The medial heel pod 16 has essentially a pea-pad shape; it has a medial edge and a lateral edge which are connected to one another at a first distal apex and a second proximal apex. The edges widen out opposite one another to define said medial heel pod.

By virtue of the fact that it pistons through the EVA shell, the medial heel pod is likely to increase the GRF against the medial plantar aspect of the heel—increasing the supination and reducing the pronation moments around the rearfoot—when the heel moves into a markedly everted position.

It has been found to be advantageous to use a softer TPR for the medial heel pod as compared to the lateral heel pod and lateral midfoot pod. This promotes a reduction in supination moments around the joints of the rearfoot (i.e. the tendency to tip the heel into inversion) and an increase in pronation moments, while the joints of the rearfoot do not themselves necessarily move to achieve the kinematic effect. The use of dual density heel pods is employed to cause a kinetic change in foot function to promote ankle stability during court sports. Preferably, the hardness of medial heel pod 16 is preferably ASKER C 45-50. It is also not out of the scope of the invention to have the medial heel pod firmer than the lateral heel pod or lateral midfoot pod or any combination thereof to address different joint moments or ankle rolls. A fabric 16A is in turn secured to the base in the lateral heel pod recession area of said base. The fabric 16A component allows the gel to properly adhere to the base.

The lateral midfoot pod 12 and lateral heel pod 14 are firmer than the medial heel pod 16. The effect is to increase the magnitude of GRF to the outside of the foot to help prevent lateral ankle roll-overs. The difference in material density between the heel pods modulates the GRF to provide this benefit. The pods provide cushioning, but the differential in the firmness of the pods modulates the GRF to improve ankle stability. It is also not out of the scope of the invention to have the lateral heel pod and/or lateral midfoot pod softer than the medial heel pod or any combination thereof to address different joint moments or ankle rolls. The length and width is preferably sufficient to place the lateral midfoot pod beneath the cuboid bone and the bases of the 4th and 5th metatarsal bones as shown in FIG. 11.

Base 5 has a raised edge that wraps around the heel and extends partially along the sides of the foot such that the insole has a heel cup, which conforms to the natural shape of the foot. As seen in FIGS. 6-10, the height of the raised edge is generally higher and thicker on the medial side of the insole and is lower and thinner on the lateral side of the insole. Base 5 may optionally define indentations 20 along bottom surface 5B extending from about ¾ way down the lateral border of the insole, around the heel area, and to the recess for the arch support. Indentations 20 may be varied as desired for aesthetic purposes or omitted entirely and may provide beneficial fit properties.

The insole may optionally define air holes 21 in the forefoot area of the insole extending from the base bottom surface 5B through the top sheet 3.

Base 5 is preferably made of foam or other material having suitable cushioning properties. Preferably, base 5 comprises an Ethylene vinyl acetate ("EVA") foam which is a copolymer of ethylene and vinyl acetate. A preferred EVA foam has a durometer (hardness) of about Asker C 45-60.

Forefoot pad 8 and first metatarsal head pad 10 are preferably made from Thermoplastic Rubber ("TPR"). The hardness of the TPR used in the forefoot pad is preferably about 52 Asker C±3. The hardness of the TPR used in the first metatarsal head pad is preferably about 49 Asker C±3.

The reason that the hardness of the TPRs preferably varies is to create differential in support under the metatarsal heads and allow the first metatarsal head to drop below the plane of the other metatarsal heads. The respective pads may be backed with a fabric before insertion into the area defined by the base to receive such pads.

The various pads and pods may be constructed with an open-cell design. This allows for use of less material and therefore a lighter insole while still providing the desired cushioning function. The cells may be backed with a fabric and the depth of the cells may be between about 3.5 and 5 mm. Alternatively, solid pads or pods may be utilized.

The open-cell design is preferably a honeycomb-like structure. A greater depth of the open-cell may provide different cushioning and spring properties as it acts more as an air cushion. Additionally, extending said air holes 21 through an open-cell may provide different cushioning and spring properties as it would allow various open-cells to more fully collapse as compared to the surrounding open-cells.

For a men's size 11-12 insole, the width of the forefoot pad from the medial to lateral side is about 85 to 95 mm. The height is about 100 to 110 mm. The depth is about 0.95 to 1.50 mm. The forefoot pad may be presented as a modified open-cell design. The modified open-cell design provides open-cells that do not extend the entire thickness of the pad or pod with approximately half the thickness of the pad or pod as a solid material and approximately the other half with the open-cell design. This may be advantageous for creating smaller air cushion pockets where less air cushioning resistance is desired.

It is desirable to minimize the total weight of the insoles by selection of materials working with the structural features of the insole. It is desirable that the total weight of the insole (men's size 10/11) be about 5.0 to 6 ounces and men's size 12/13 about 6.5 to 7.5 ounces. Other sizes will be proportional. Using the open-cell designs may be a way to provide a lighter insole.

In a preferred embodiment, base 5 is covered with top sheet 3, which is preferably a non-woven fabric layer with a low coefficient of friction so as to minimize the possibility of blisters. In a preferred embodiment, the fabric is treated with an antibacterial agent, which in combination with a moisture barrier reduces odor causing bacteria and fungi. A series of air holes 21 may extend through top sheet 3 and base 5 to permit air circulation above and below insole 1.

In a first preferred embodiment of the present invention, the various components of an insole which are secured to base 5 in the recesses defined by base 5 on bottom surface 5B are permanently affixed to base 5 using an appropriate means such as an adhesive. The components may be secured during the molding process using techniques known in the art of molding insoles.

Figure 2:
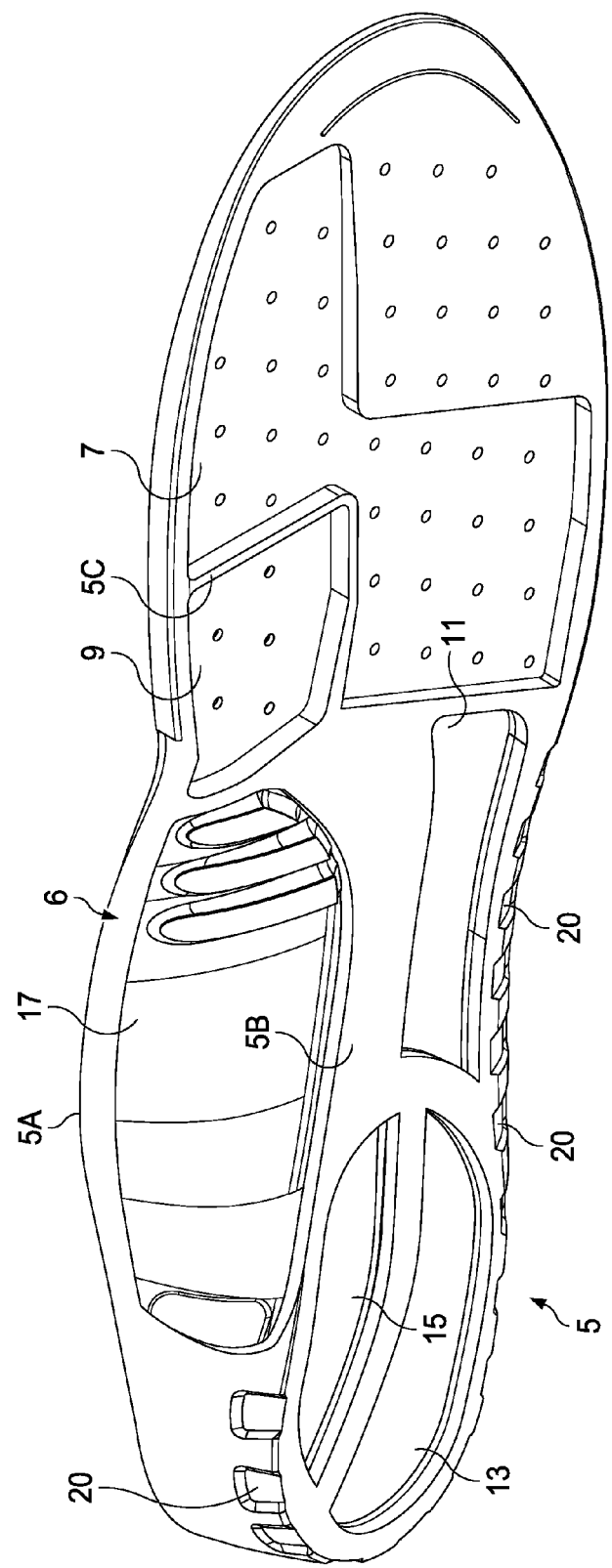
FIG. 2 is a perspective view showing the base of the insole.

FIG. 2 illustrates a perspective view of the bottom of the base without any pads, pods, or attachments. Base 5 has a top surface 5A and an opposite bottom surface 5B. Preferably, said top surface 5A of said base layer 5 defines an upwardly-extending portion or metatarsal dome 38 (as shown in FIGS. 3, 8 and 9) that lies under the metatarsal head area of the foot. Base 5 also defines a longitudinal arch support 6 that extends upwardly along the medial side of the insole to provide extra cushion and support to the arch area of the foot.

The bottom surface 5B of base 5 defines a forefoot pad recession area 7 in the forefoot area, a first metatarsal head pad recession area 9 in the area of the first metatarsal, a lateral midfoot pod recession area 11 in the middle of the insole near the lateral side, a lateral heel pod recession area 13 in the heel area near the lateral side, a medial heel pod recession area 15 in the heel area near the medial side, and an arch recession area 17 from the middle of the insole towards the heel area near the medial side. Divider 5C may also be employed to help further distinguish the edges of first metatarsal head recess area 9 and forefoot pad recession area 7.

The forefoot pad recession area 7 begins near the distal end of the insole and extends under the hallux proximally to the front of the first metatarsal head. The forefoot pad recession area 7 then extends laterally and proximally under the lesser metatarsal heads to the back of the metatarsal heads. Forefoot pad recession area 7 in essence fully surrounds the distal and lateral sides of the first metatarsal head pad recession area 9.

Forefoot pad recession area 7 has a medial edge, a lateral edge, a proximal (back) edge and a distal (front) edge. The medial edge of forefoot pad 8 extends along a line spaced laterally from said medial border of said insole, essentially extending from near said toe end to the proximal edge of said metatarsal pad area. The proximal edge extends from said medial edge transversely diagonally (or laterally and proximally) to said lateral edge, which is spaced medially from said lateral border of said insole. The lateral edge connects said proximal edge to the top edge of said forefoot pad. In use, forefoot pad recession area 7 underlies the big toe of a user's foot, and the "ball" of the foot, excluding the first metatarsal head or medial ball of the user's foot. (See FIG. 11, bones of foot on insole). Forefoot pad recession area 7 is adapted to engage a forefoot pad.

First metatarsal head pad recession area 9 is a recess in the bottom surface 5B of the base 5 and lies under the first metatarsal head of the foot. First metatarsal head pad 10 is shaped essentially the same as first metatarsal head pad recession area 9 and is secured to first metatarsal head pad recession area 9.

The first metatarsal head pad recession area 9, in shape, is a slightly irregular rectangular or polygonal shape. Preferably, said first metatarsal head pad recession area 9 has an essentially linear distal edge, a slightly curvilinear medial edge which follows the curve of the medial border of the insole, a proximal edge which is curved or angled to follow the shape of the metatarsal edge of longitudinal arch support 6, and a lateral edge which is curvilinear or linear. First metatarsal head pad recession area 9 is adapted to engage a first metatarsal head pad.

The arch recession area 17 is located along the longitudinal arch support 6 and has a proximal edge end nearest the heel end of the insole and extends toward said toe end of the insole to a distal edge end. Connecting said proximal edge end to said distal edge end is a medial edge and a lateral edge, with said lateral edge having a parabolic-like shape. In general, it approximately lies in the arch area of the foot or under the talus, navicular, first cuneiform, and part of the first metatarsal.

Arch recession area 17 partially wraps up the medial side of base 5 under the medial longitudinal arch. Preferably, a portion of base 5 within the arch recession area 17 is molded so that portions of the foam material are adapted to engage an rib-shaped openings of an arch support (see 18C of FIG. 1). Advantageously, the foam is able to bulge through the rib-shaped openings when base 5 is compressed (e.g., while walking or running) to provide additional cushioning and support to the arch. The arch recession area 17 is adapted to engage an arch support.

Lateral midfoot pod recession area 11 extends from the back of the metatarsal heads proximally to the front of the heel area along the lateral side of the bottom surface 5B. The lateral midfoot pod recession area 11 has a lateral edge which is adjacent said lateral border of said insole. Lateral midfoot pod recession area 11 is adapted to engage a lateral midfoot pod.

Lateral heel pod recession area 13 extends through the heel area along the lateral side of heel area on the bottom surface 5B toward the heel end. Lateral heel pod recession area 13 has a lateral edge which extends along the lateral border of insole 1 from said heel end to a lateral heel edge spaced apart from said lateral midfoot pod recession area 11. The lateral edge curves in the area of the heel to follow the outline of the insole heel end. The lateral heel pod recession area 13 also has a medial curvilinear edge. The overall configuration is roughly a three-sided geometric shape with curved edges as described rather than straight lines. Lateral heel pod recession area 13 is adapted to engage a lateral heel pod.

Medial heel pod recession area 15 extends through the heel area along the medial side of heel area on the bottom surface 5B just short of the heel end. The medial heel pod recession area 15 has essentially a pea-pad shape; it has a medial edge and a lateral edge which are connected to one another at a first distal apex and a second proximal apex. The edges widen out opposite one another to define said medial heel pod recession area 15. Medial heel pod recession area 15 is adapted to engage a medial heel pod.

Base 5 has a raised edge that wraps around the heel and extends partially along the sides of the foot such that the insole defines a heel cup in the heel area of the insole, which conforms to the natural shape of the foot. The height of the raised edge is generally higher and thicker on the medial side of the insole and is lower and thinner on the lateral side of the insole. Base 5 may optionally define indentations 20 along bottom surface 5B extending from about ¾ way down the lateral border of the insole, around the heel area, and to the recess for the arch support. Indentations 20 may be varied as desired for aesthetic purposes or omitted entirely and may provide beneficial fit properties.

The insole may optionally define air holes 21 in the forefoot area of the insole extending from the base bottom surface 5B through the top sheet 3.

FIG. 3 is a top view of the insole illustrating the top sheet 3 and metatarsal dome 38. Insole 1 comprises a top sheet 3 secured across the entire top surface of the bases. Preferably, the top surface of the base defines an upwardly-extending portion or metatarsal dome 38 that lies under the metatarsal head area of the foot. The upward extension of metatarsal dome 38 pushes up a portion of the top sheet 3 that corresponds to the area of the metatarsal dome 38.

Metatarsal dome 38 preferably lies under the second to fifth metatarsal heads. Metatarsal dome 38 provides a redistribution of pressure away from the lesser metatarsal heads for general forefoot comfort and relatively increases the depth of the first metatarsal head pad recession area 9 to encourage a greater degree of first ray plantarflexion during the propulsive phase of gait.

In a preferred embodiment, top sheet 3 is a non-woven fabric layer with a low coefficient of friction so as to minimize the possibility of blisters. In a preferred embodiment, the fabric is treated with an antibacterial agent, which in combination with a moisture barrier reduces odor causing bacteria and fungi. A series of air holes 21 may extend through top sheet 3 and the base to permit air circulation above and below insole 1.

Figure 4:
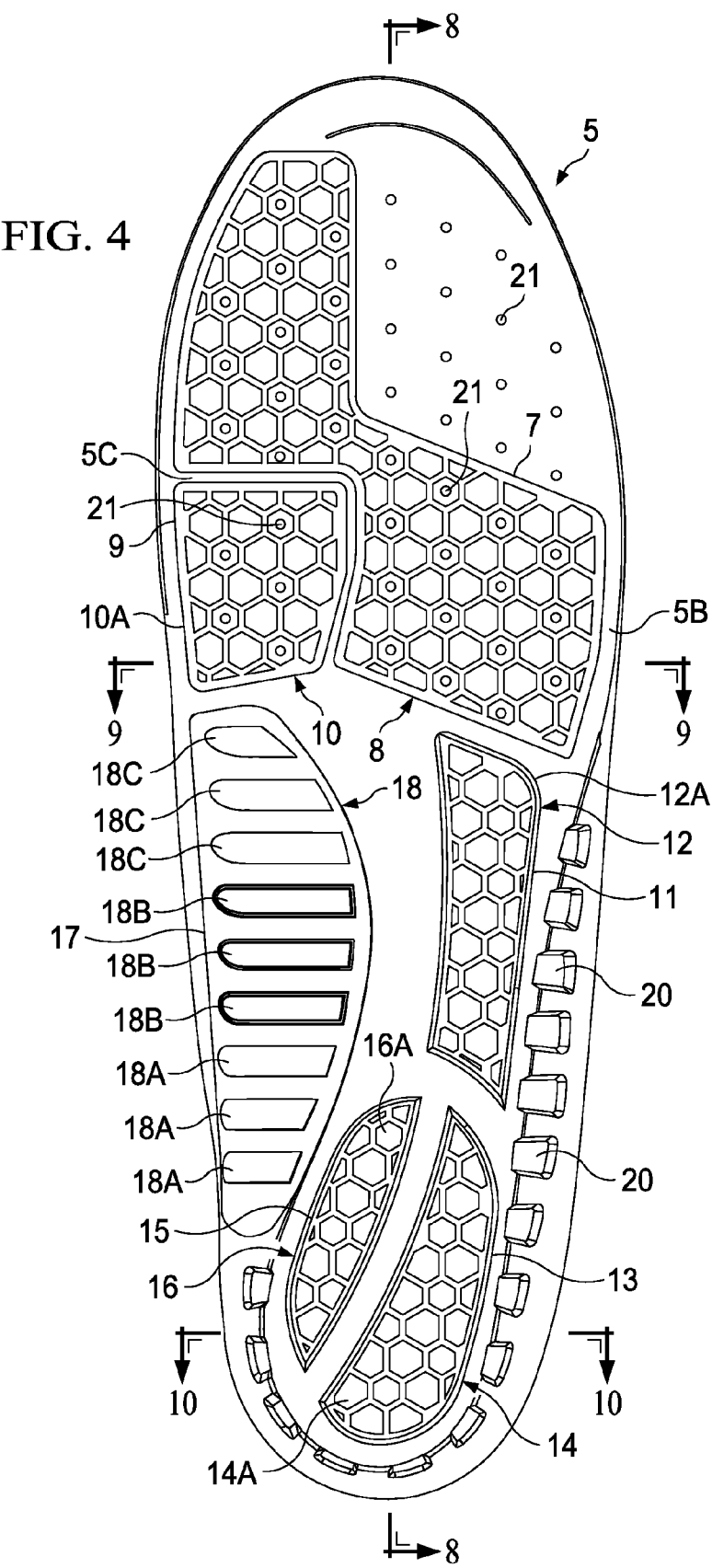
FIG. 4 is a bottom (plantar) view of the insole.

FIG. 4 illustrates the bottom view of the insole. Insole 1 preferably comprises a top sheet and a base 5 having a top surface secured to said top sheet and an opposite bottom surface 5B. Base 5 also defines a longitudinal arch support that extends upwardly along the medial side of the insole to provide extra cushion and support to the arch area of the foot. The bottom surface 5B of base 5 defines a forefoot pad recession area 7 in the forefoot area, a first metatarsal head pad recession area 9 in the area of the first metatarsal, a lateral midfoot pod recession area 11 in the middle of the insole near the lateral side, a lateral heel pod recession area 13 in the heel area near the lateral side, a medial heel pod recession area 15 in the heel area near the medial side, and an arch recession area 17 from the middle of the insole towards the heel area near the medial side.

The forefoot pad recession area 7 begins near the distal end of the insole and extends under the hallux proximally to the front of the first metatarsal head. The forefoot pad recession area 7 then extends laterally and proximally under the lesser metatarsal heads to the back of the metatarsal heads. Forefoot pad recession area 7 in essence fully surrounds the distal and lateral sides of the first metatarsal head pad 10.

Forefoot pad 8 is shaped essentially the same as forefoot pad recession area 7 and is secured therein. Forefoot pad 8 has a medial edge, a lateral edge, a proximal (back) edge and a distal (front) edge. The medial edge of forefoot pad 8 extends along a line spaced laterally from said medial border of said insole, essentially extending from near said toe end to the proximal edge of said metatarsal pad area. The proximal edge extends from said medial edge transversely diagonally (or laterally and proximally) to said lateral edge, which is spaced medially from said lateral border of said insole. The lateral edge connects said proximal edge to said top edge of said forefoot pad. In use, forefoot pad recession area 7 and forefoot pad 8 underlie the big toe of a user's foot, and the "ball" of the foot, excluding the first metatarsal head or medial ball of the user's foot. (See FIG. 11, bones of foot on insole).

The forefoot pad recession area 7 may be lined with a forefoot pad area cloth 8A having a base surface and a pad surface, secured to said base along said base surface and said forefoot pad along said pad surface. Alternatively, a fabric may be secured to forefoot pad 8 and the composite structure secured to forefoot pad recession area 7 and inserted and secured to said forefoot pad recession area 7 by adhesion.

An adhesive may be used to secure the components. The forefoot pad 8 provides cushioning and energy return on landing from a vertical jump. It serves as a propulsion pad beneath the big toe (hallux). The portion of the forefoot pad between the lateral border and the portion underlying the big toe in use serves as a propulsion pad and support for the lesser metatarsal heads of a user's foot.

First metatarsal head pad recession area 9 is a recess in the bottom surface 5B of the base 5 and lies under the first metatarsal head of the foot. First metatarsal head pad 10 is shaped essentially the same as first metatarsal head pad recession area 9 and is secured to first metatarsal head pad recession area 9. A first metatarsal head pad area cloth 10A may be secured to the base layer on one side and the metatarsal pad on the other, similar to that described above in relation to said forefoot pad. Alternatively, a fabric may be instead secured to said metatarsal pad, and the composite structure inserted and secured to said metatarsal pad recession area by adhesion.

In basketball, and other court sports, it is important that the metatarsophalangeal joints between the heads of the metatarsal bones and the bases of the proximal phalanges (toes) of the user's foot are free to dorsiflex, an upward or backward flexion. Forefoot pad 8 and first metatarsal head pad 10 can move independently from one another due to differential in densities. Forefoot pad 8 is preferably firmer than first metatarsal head pad 10. Forefoot pad 8 supports the lesser metatarsal heads and first metatarsal head pad 10 allows the first metatarsal head to depress into a lower position allowing more efficient dorsiflexion of the first toe joint. The area of forefoot pad 8 beneath the great toe adds a slight push up force to also encourage improved big toe joint dorsiflexion. In this manner, forefoot pad 8 may have less density then the first metatarsal head pad 10, depending on the physical characteristics desired and the intended use of the insole by the user. Alternatively, a softer forefoot pad 8 than first metatarsal head pad 10 limits the dorsiflexion of the first toe joint as that may be advantageous in the use of the insole in various activities and physical movements.

Forefoot pad 8 has a different density than the first metatarsal head pad 10 and may have different densities compared to the other pad and pod inserts by using different materials, an open-cell design, or varying the thickness of the forefoot pad 8. The use of different densities on the forefoot pad 8 compared to the first metatarsal head pad 10 increases the performance of the insole in handling lateral force impacts by allowing for improved hallux dorsiflexion.

The open-cell design is preferably a honeycomb-like structure. A greater depth of the open-cell may provide different cushioning and spring properties as it acts more as an air cushion. Additionally, extending said air holes 21 through an open-cell may provide different cushioning and spring properties as it would allow various open-cells to more fully collapse as compared to the surrounding open-cells.

The forefoot pad may be presented as a modified open-cell design. The modified open-cell design provides open-cells that do not extend the entire thickness of the pad or pod with approximately half the thickness of the pad or pod as a solid material and approximately the other half with the open-cell design. This may be advantageous for creating smaller air cushion pockets where less air cushioning resistance is desired.

It is estimated that using tougher materials may increase the durability of the insole by 35% to 65% over insoles that use softer materials for this portion of the foot insole.

In use, first metatarsal head pad 10 remains under the first metatarsal head (i.e., the medial ball of the user's foot) and moves with it. This may also be thought of in terms of reducing the GRF beneath the first metatarsal head. This enhances propulsion of the foot in wearers with FHL. The portion of forefoot pad 8 near the lateral border of the insole concurrently supports the lesser metatarsal heads of the user's foot. When the user dorsiflexes the first metatarsophalangeal joint (the big toe joint), the forefoot pad area near the medial border of the insole in the toe area applies a gentle upwards force to encourage improved dorsiflexion of the first toe joint of the user's foot.

The first metatarsal head pad 10, in shape, is a slightly irregular rectangular or polygonal shape. Preferably, said first metatarsal head pad 10 has an essentially linear distal edge, a slightly curvilinear medial edge which follows the curve of the medial border of the insole, a proximal edge which is curved or angled to follow the shape of the metatarsal edge of longitudinal arch support 6, and a lateral edge which is curvilinear or linear. Preferably, said first metatarsal head pad 10 is about 4.5 mm thick. Thickness gives sufficient initial support but allows for adequate compression once loaded. First metatarsal head pad's 10 basic design is to create differential in support under the metatarsal heads and allow the first metatarsal head to drop below the plane of the other metatarsal heads.

The arch recession area 17 is located along the longitudinal arch support 6 and has a proximal edge end nearest the heel end of the insole and extends toward said toe end of the insole to a distal edge end. Connecting said proximal edge end to said distal edge end is a medial edge and a lateral edge, with said lateral edge having a parabolic-like shape. In general, it approximately lies in the arch area of the foot or under the talus, navicular, first cuneiform, and part of the first metatarsal. Arch support 18 is shaped essentially the same as arch recession area 17 and is secured to said arch recession area 17 on bottom surface 5B of base 5.

The arch support 18 defines, from said proximal edge end going toward said distal edge end, a plurality of ribs extending outwardly therefrom (18A), a plurality of essentially level ribs (18B) having a rib outline indented in said arch support, and one or more rib-shaped openings (18C). In a preferred embodiment, three of said plurality of ribs, or extending ribs 18A, extend outwardly from said arch support 18 and are approximately 0.50 mm thick. In a preferred embodiment, three of said essentially level ribs 18B are employed and said rib outline is approximately 0.50 mm deep. In a preferred embodiment, three rib-shaped openings 18C are defined which allow said base 5 to extend therethrough. The width of each rib is approximately 0.5 mm.

Arch support 18 partially wraps up the medial side of base 5 under the medial longitudinal arch. Rib-shaped openings 18C improve flexibility at said distal edge end of arch support 18 without sacrificing longitudinal arch support at the middle and heel end of arch support 18. Preferably, base 5 is molded so that portions of the foam material project into rib-shaped openings 18C so that such portions are approximately flush with the outer surface of arch support 18 and mechanically lock arch support 18 and base 5 together. Advantageously, the foam is also able to bulge through rib-shaped openings 18C when base 5 is compressed (e.g., while walking or running) to provide additional cushioning and support to the arch.

The first three rib-shaped openings 18C in the distal one-third of the arch support 18 are provided to allow the area immediately proximal to the first metatarsal head (i.e., the distal shaft of the first metatarsal) to remain flexible in order to encourage unrestricted plantarflexion of the first ray during the propulsive phase of gait.

The central and proximal two-thirds of the arch support 18 (level ribs 18B and extending ribs 18A) are stiffened by progressively thicker transverse bars to provide improved support to the arch and the application of higher magnitudes of anti-pronation GRF into the area of the sustentaculum tali when the foot moves into a pronated position.

When the foot takes up a "neutral" (i.e., neither pronated or supinated) position, the arch support applies a gentle supination (anti-pronation) moment to subtalar joint (i.e., the rearfoot), while the lateral midfoot pod applies a gentle pronation moment to the forefoot to "stabilize" the midtarsal joint.

When the foot moves into a pronated position, the arch support applies a higher magnitude of GRF against the area beneath the sustentaculum tali (i.e., the proximal arch) increasing the supination (anti-pronation) moment to subtalar joint (i.e., the rearfoot), while a lateral midfoot pod becomes relatively inactive.

When the foot takes up a supinated position that threatens lateral ankle instability and injury, the lateral midfoot pod (and the lateral heel pod, if the heel is also in contact with the ground) increases the magnitude of GRF against the lateral aspect of the foot to create pronation moments that may help to reduce the incidence of ankle sprains.

For a men's size 11-12, the arch support is approximately 110-111 mm long, the preferred width of said proximal edge end of said arch support is about 24 to 25 mm. The width at the widest point, adjacent said essentially level ribs, is about 37.5 to 38.5 mm. The arch support is preferably made from Nylon 66 with a hardness of 95 Shore A.

Lateral midfoot pod recession area 11 extends from the back of the metatarsal heads proximally to the front of the heel area along the lateral side of the bottom surface 5B. Lateral midfoot pod 12 is shaped essentially the same as lateral midfoot pod recession area 11 and is secured to said base in said lateral midfoot pod recession area 11. The lateral midfoot pod 12 has a lateral edge which is adjacent said lateral border of said insole when secured to said lateral midfoot pod recession area 11 of said base 5. The length of the lateral midfoot pod 12 is preferably sufficient to provide cushioning and an increase in GRF to the lateral aspect of the midfoot to help prevent ankle roll-overs.

When the foot moves into a supinated position that threatens lateral ankle instability (usually upon landing), the lateral midfoot pod (and the lateral heel pod, when the heel contacts the ground) increases the magnitude of GRF against the lateral aspect of the foot to create pronation (anti-supination) moments that may help to reduce the incidence of ankle sprains.

Lateral midfoot pod 12 is preferably made from TPR of a hardness of about 49 ASKER C±3 and a fabric 12A to which the TPR is secured. The fabric is in turn secured to the base in the lateral midfoot pod recession area of said base. The fabric 12A component allows the TPR to properly adhere to the base 5.

Lateral heel pod recession area 13 extends through the heel area along the lateral side of heel area on the bottom surface 5B toward the heel end. Lateral heel pod 14 is shaped essentially the same as lateral heel pod recession area 13 and is attached to said lateral heel pod recession area 13 of said insole base 5. Lateral heel pod 14 (and a fabric secured thereto) has a lateral edge which extends along the lateral border of insole 1 from said heel end to a lateral heel edge spaced apart from said lateral midfoot pod. The lateral edge curves in the area of the heel to follow the outline of the insole heel end. The lateral heel pod 14 also has a medial curvilinear edge. The overall configuration is roughly a three-sided geometric shape with curved edges as described rather than straight lines.

The configuration, material and position of the lateral heel pod 14 provides cushioning and, in association with the medial heel pod 16, an increase in GRF to the lateral aspect of the user's heel to help reduce the incidence of lateral ankle roll-overs. The hardness of the lateral heel pod is preferably essentially the same as the lateral midfoot pod, which work in concert to help reduce the incidence of lateral ankle roll-overs. It is preferably made of TPR having an ASKER C value of 50±3. A fabric 14A is in turn secured to the base in the lateral heel pod recession area of said base. The fabric 14A component allows the TPR to properly adhere to the base. Alternatively, the configuration, material and position of the lateral heel pod 14 provides cushioning and, in association with the medial heel pod 16, an increase in GRF to the medial aspect of the user's heel to help reduce the incidence of medial ankle roll-overs.

Due to the properties of the TPR and the open-cell hexagonal honeycomb-like design, the lateral heel pod is likely to reduce the impact transient at heel strike "cushioning" the contact phase of gait.

Medial heel pod recession area 15 extends through the heel area along the medial side of heel area on the bottom surface 5B just short of the heel end. Medial heel pod 16 is shaped essentially the same as medial heel pod recession area 15 and is attached to medial heel pod recession area 15 of said base 5. The medial heel pod 16 has essentially a pea-pad shape; it has a medial edge and a lateral edge which are connected to one another at a first distal apex and a second proximal apex. The edges widen out opposite one another to define said medial heel pod.

By virtue of the fact that it pistons through the EVA shell, the medial heel pod is likely to increase the GRF against the medial plantar aspect of the heel—increasing the supination and reducing the pronation moments around the rearfoot—when the heel moves into a markedly everted position.

It has been found to be advantageous to use a softer TPR for the medial heel pod as compared to the lateral heel pod and lateral midfoot pod. This promotes a reduction in supination moments around the joints of the rearfoot (i.e. the tendency to tip the heel into inversion) and an increase in pronation moments, while the joints of the rearfoot do not themselves necessarily move to achieve the kinematic effect. The use of dual density heel pods is employed to cause a kinetic change in foot function to promote ankle stability during court sports. Preferably, the hardness of medial heel pod 16 is preferably ASKER C 45-50. It is also not out of the scope of the invention to have the medial heel pod firmer than the lateral heel pod or lateral midfoot pod or any combination thereof to address different joint moments or ankle rolls. A fabric 16A is in turn secured to the base in the lateral heel pod recession area of said base. The fabric 16A component allows the gel to properly adhere to the base.

The lateral midfoot pod 12 and lateral heel pod 14 are firmer than the medial heel pod 16. The effect is to increase the magnitude of GRF to the outside of the foot to help prevent lateral ankle roll-overs. The difference in material density between the heel pods modulates the GRF to provide this benefit. The pods provide cushioning, but the differential in the firmness of the pods modulates the GRF to improve ankle stability. It is also not out of the scope of the invention to have the lateral heel pod and/or lateral midfoot pod softer than the medial heel pod or any combination thereof to address different joint moments or ankle rolls. The length and width is preferably sufficient to place the lateral midfoot pod beneath the cuboid bone and the bases of the 4th and 5th metatarsal bones as shown in FIG. 11.

Base 5 has a raised edge that wraps around the heel and extends partially along the sides of the foot such that the insole has a heel cup, which conforms to the natural shape of the foot. The height of the raised edge is generally higher and thicker on the medial side of the insole and is lower and thinner on the lateral side of the insole. Base 5 may optionally define indentations 20 along bottom surface 5B extending from about ¾ way down the lateral border of the insole, around the heel area, and to the recess for the arch support. Indentations 20 may be varied as desired for aesthetic purposes or omitted entirely and may provide beneficial fit properties.

The insole may optionally define air holes 21 in the forefoot area of the insole extending from the base bottom surface 5B through the top sheet 3. Base 5 is preferably made of foam or other material having suitable cushioning properties. Preferably, base 5 comprises an Ethylene vinyl acetate ("EVA") foam which is a copolymer of ethylene and vinyl acetate. A preferred EVA foam has a durometer (hardness) of about Asker C 45-60.

Forefoot pad 8 and first metatarsal head pad 10 are preferably made from Thermoplastic Rubber ("TPR"). The hardness of the TPR used in the forefoot pad is preferably about 52 Asker C±3. The hardness of the TPR used in the first metatarsal head pad is preferably about 49 Asker C±3. The reason that the hardness of the TPRs preferably varies is to create differential in support under the metatarsal heads and allow the first metatarsal head to drop below the plane of the other metatarsal heads. The respective pads may be backed with a fabric before insertion into the area defined by the base to receive such pads.

The various pads and pods may be constructed with an open-cell design. This allows for use of less material and therefore a lighter insole while still providing the desired cushioning function. The cells may be backed with a fabric and the depth of the cells may be between about 3.5 and 5 mm. Alternatively, solid pads or pods may be utilized.

The open-cell design is preferably a honeycomb-like structure. A greater depth of the open-cell may provide different cushioning and spring properties as it acts more as an air cushion. Additionally, extending said air holes 21 through an open-cell may provide different cushioning and spring properties as it would allow various open-cells to more fully collapse as compared to the surrounding open-cells.

For a men's size 11-12 insole, the width of the forefoot pad from the medial to lateral side is about 85 to 95 mm. The height is about 100 to 110 mm. The depth is about 0.95 to 1.50 mm. The forefoot pad may be presented as a modified open-cell design. The modified open-cell design provides open-cells that do not extend the entire thickness of the pad or pod with approximately half the thickness of the pad or pod as a solid material and approximately the other half with the open-cell design. This may be advantageous for creating smaller air cushion pockets where less air cushioning resistance is desired.

It is desirable to minimize the total weight of the insoles by selection of materials working with the structural features of the insole. It is desirable that the total weight of the insole (men's size 10/11) be about 5.0 to 6 ounces and men's size 12/13 about 6.5 to 7.5 ounces. Other sizes will be proportional. Using the open-cell designs may be a way to provide a lighter insole.

A series of air holes 21 may extend through top sheet 3 and base 5 to permit air circulation above and below insole 1. In a first preferred embodiment of the present invention, the various components of an insole which are secured to base 5 in the recesses defined by base 5 on bottom surface 5B are permanently affixed to base 5 using an appropriate means such as an adhesive. The components may be secured during the molding process using techniques known in the art of molding insoles.

Figure 5:
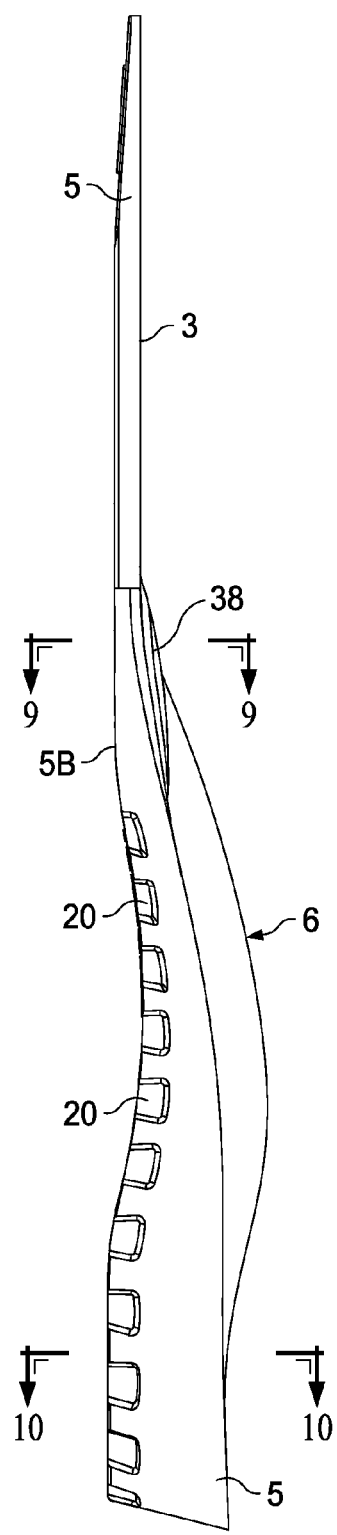
FIG. 5 is a lateral (outer side) view of the insole.

FIG. 5 illustrates a medial side view of the insole. Insole 1 preferably comprises a top sheet 3 and a base 5 having a top surface secured to said top sheet and an opposite bottom surface 5B. Preferably, said top surface of said base layer 5 defines an upwardly-extending portion or metatarsal dome 38 that lies under the metatarsal head area of the foot. Base 5 also defines a longitudinal arch support 6 that extends upwardly along the medial side of the insole to provide extra cushion and support to the arch area of the foot.

Metatarsal dome 38 preferably lies under the second to fifth metatarsal heads. Metatarsal dome 38 provides a redistribution of pressure away from the lesser metatarsal heads for general forefoot comfort and relatively increases the depth of the first metatarsal head pad recession area to encourage a greater degree of first ray plantarflexion during the propulsive phase of gait.

Base 5 has a raised edge that wraps around the heel and extends partially along the sides of the foot such that the insole has a heel cup, which conforms to the natural shape of the foot. As best seen in FIGS. 6-10, the height of the raised edge is generally higher and thicker on the medial side of the insole and is lower and thinner on the lateral side of the insole. Base 5 may optionally define indentations 20 along bottom surface 5B extending from about ¾ way down the lateral border of the insole, around the heel area, and to the recess for the arch support. Indentations 20 may be varied as desired for aesthetic purposes or omitted entirely and may provide beneficial fit properties.

The insole may optionally define air holes 21 in the forefoot area of the insole extending from the base bottom surface 5B through the top sheet 3.

Base 5 is preferably made of foam or other material having suitable cushioning properties. Preferably, base 5 comprises an Ethylene vinyl acetate ("EVA") foam which is a copolymer of ethylene and vinyl acetate. A preferred EVA foam has a durometer (hardness) of about Asker C 45-60.

In a preferred embodiment, base 5 is covered with top sheet 3, which is preferably a non-woven fabric layer with a low coefficient of friction so as to minimize the possibility of blisters. In a preferred embodiment, the fabric is treated with an antibacterial agent, which in combination with a moisture barrier reduces odor causing bacteria and fungi. A series of air holes 21 may extend through top sheet 3 and base 5 to permit air circulation above and below insole 1.

Figure 6:
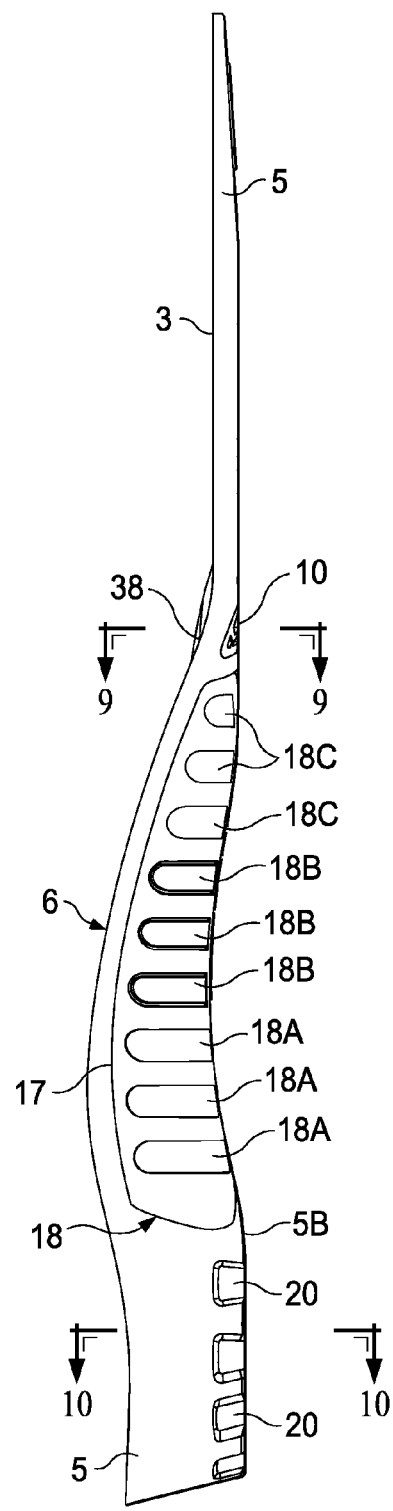
FIG. 6 is a medial (inner side) view of the insole.

FIG. 6 illustrates a lateral side view of the insole. Insole 1 preferably comprises a top sheet 3 and a base 5 having a top surface secured to said top sheet 3 and an opposite bottom surface 5B. Preferably, said top surface of said base layer 5 defines an upwardly-extending portion or metatarsal dome 38 that lies under the metatarsal head area of the foot. Base 5 also defines a longitudinal arch support 6 that extends upwardly along the medial side of the insole to provide extra cushion and support to the arch area of the foot.

Metatarsal dome 38 preferably lies under the second to fifth metatarsal heads. Metatarsal dome 38 provides a redistribution of pressure away from the lesser metatarsal heads for general forefoot comfort and relatively increases the depth of the first metatarsal head pad recession area 9 to encourage a greater degree of first ray plantarflexion during the propulsive phase of gait.

A back and medial edge of a first metatarsal head pad 10 is visible extending slightly up the medial side of the insole. First metatarsal head pad 10 is located under the first metatarsal head of the foot forward of an arch support 18.

The arch recession area 17 is located along the longitudinal arch support 6 and has a proximal edge end nearest the heel end of the insole and extends toward said toe end of the insole to a distal edge end. Connecting said proximal edge end to said distal edge end is a medial edge and a lateral edge, with said lateral edge having a parabolic-like shape. In general, it approximately lies in the arch area of the foot or under the talus, navicular, first cuneiform, and part of the first metatarsal. Arch support 18 is shaped essentially the same as arch recession area 17 and is secured to said arch recession area 17 on bottom surface 5B of base 5.

The arch support 18 defines, from said proximal edge end going toward said distal edge end, a plurality of ribs extending outwardly therefrom (18A), a plurality of essentially level ribs (18B) having a rib outline indented in said arch support, and one or more rib-shaped openings (18C). In a preferred embodiment, three of said plurality of ribs, or extending ribs 18A, extend outwardly from said arch support 18 and are approximately 0.50 mm thick. In a preferred embodiment, three of said essentially level ribs 18B are employed and said rib outline is approximately 0.50 mm deep. In a preferred embodiment, three rib-shaped openings 18C are defined which allow said base 5 to extend therethrough. The width of each rib is approximately 0.5 mm.

Arch support 18 partially wraps up the medial side of base 5 under the medial longitudinal arch. Rib-shaped openings 18C improve flexibility at said distal edge end of arch support 18 without sacrificing longitudinal arch support at the middle and heel end of arch support 18. Preferably, base 5 is molded so that portions of the foam material project into rib-shaped openings 18C so that such portions are approximately flush with the outer surface of arch support 18 and mechanically lock arch support 18 and base 5 together. Advantageously, the foam is also able to bulge through rib-shaped openings 18C when base 5 is compressed (e.g., while walking or running) to provide additional cushioning and support to the arch.

The first three rib-shaped openings 18C in the distal one-third of the arch support 18 are provided to allow the area immediately proximal to the first metatarsal head (i.e., the distal shaft of the first metatarsal) to remain flexible in order to encourage unrestricted plantarflexion of the first ray during the propulsive phase of gait.

The central and proximal two-thirds of the arch support 18 (level ribs 18B and extending ribs 18A) are stiffened by progressively thicker transverse bars to provide improved support to the arch and the application of higher magnitudes of anti-pronation GRF into the area of the sustentaculum tali when the foot moves into a pronated position.

When the foot takes up a "neutral" (i.e., neither pronated or supinated) position, the arch support applies a gentle supination (anti-pronation) moment to subtalar joint (i.e., the rearfoot), while the lateral midfoot pod applies a gentle pronation moment to the forefoot to "stabilize" the midtarsal joint.

When the foot moves into a pronated position, the arch support applies a higher magnitude of GRF against the area beneath the sustentaculum tali (i.e., the proximal arch) increasing the supination (anti-pronation) moment to subtalar joint (i.e., the rearfoot), while a lateral midfoot pod becomes relatively inactive.

When the foot takes up a supinated position that threatens lateral ankle instability and injury, the lateral midfoot pod (and the lateral heel pod, if the heel is also in contact with the ground) increases the magnitude of GRF against the lateral aspect of the foot to create pronation moments that may help to reduce the incidence of ankle sprains.

For a men's size 11-12, the arch support is approximately 110-111 mm long, the preferred width of said proximal edge end of said arch support is about 24 to 25 mm. The width at the widest point, adjacent said essentially level ribs, is about 37.5 to 38.5 mm. The arch support is preferably made from Nylon 66 with a hardness of 95 Shore A.

Base 5 has a raised edge that wraps around the heel and extends partially along the sides of the foot such that the insole has a heel cup, which conforms to the natural shape of the foot. As best seen in FIGS. 6-10, the height of the raised edge is generally higher and thicker on the medial side of the insole and is lower and thinner on the lateral side of the insole. Base 5 may optionally define indentations 20 along bottom surface 5B extending from about ¾ way down the lateral border of the insole, around the heel area, and to the recess for the arch support. Indentations 20 may be varied as desired for aesthetic purposes or omitted entirely and may provide beneficial fit properties.

Base 5 is preferably made of foam or other material having suitable cushioning properties. Preferably, base 5 comprises an Ethylene vinyl acetate ("EVA") foam which is a copolymer of ethylene and vinyl acetate. A preferred EVA foam has a durometer (hardness) of about Asker C 45-60.

In a preferred embodiment, base 5 is covered with top sheet 3, which is preferably a non-woven fabric layer with a low coefficient of friction so as to minimize the possibility of blisters. In a preferred embodiment, the fabric is treated with an antibacterial agent, which in combination with a moisture barrier reduces odor causing bacteria and fungi. A series of air holes 21 may extend through top sheet 3 and base 5 to permit air circulation above and below insole 1.

Figure 7:
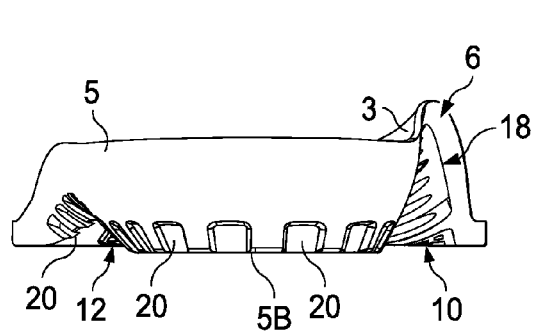
FIG. 7 is a rear (proximal) view of the insole.

FIG. 7 illustrates a rear view of the insole. Insole 1 preferably comprises a top sheet 3 and a base 5 having a top surface secured to said top sheet 3 and an opposite bottom surface 5B. Base 5 also defines a longitudinal arch support 6 that extends upwardly along the medial side of the insole to provide extra cushion and support to the arch area of the foot.

A back and medial edge of a first metatarsal head pad 10 is visible extending slightly up the medial side of the insole. First metatarsal head pad 10 is located under the first metatarsal head of the foot forward of an arch support 18. The lateral edge of lateral midfoot pod 12 is shown extending laterally from the midfoot area. Further details for first metatarsal head pad 10 and lateral midfoot pod 12 are described above in FIG. 1.

Arch support 18 is located along the longitudinal arch support 6 and is secured to an arch recession area 17 in bottom surface 5B of base 5. Arch support 18 has a proximal edge end nearest the heel end of the insole and extends toward said toe end of the insole to a distal edge end. Connecting said proximal edge end to said distal edge end is a medial edge and a lateral edge, with said lateral edge having a parabolic-like shape. In general, it approximately lies in the arch area of the foot or under the talus, navicular, first cuneiform, and part of the first metatarsal. Arch support 18 partially wraps up the medial side of base 5 under the medial longitudinal arch. The arch support 18 defines a plurality of ribs extending outwardly therefrom (18A), a plurality of essentially level ribs (18B) having a rib outline indented in said arch support, and one or more rib-shaped openings (18C) that are further described in FIGS. 1, 4 and 6.

For a men's size 11-12, the arch support is approximately 110-111 mm long, the preferred width of said proximal edge end of said arch support is about 24 to 25 mm. The width at the widest point, adjacent said essentially level ribs, is about 37.5 to 38.5 mm. The arch support is preferably made from Nylon 66 with a hardness of 95 Shore A.

Base 5 has a raised edge that wraps around the heel and extends partially along the sides of the foot such that the insole has a heel cup, which conforms to the natural shape of the foot. As best seen in FIGS. 6-10, the height of the raised edge is generally higher and thicker on the medial side of the insole and is lower and thinner on the lateral side of the insole. Base 5 may optionally define indentations 20 along bottom surface 5B extending from about ¾ way down the lateral border of the insole, around the heel area, and to the recess for the arch support. Indentations 20 may be varied as desired for aesthetic purposes or omitted entirely and may provide beneficial fit properties.

Base 5 is preferably made of foam or other material having suitable cushioning properties. Preferably, base 5 comprises an Ethylene vinyl acetate ("EVA") foam which is a copolymer of ethylene and vinyl acetate. A preferred EVA foam has a durometer (hardness) of about Asker C 45-60.

In a preferred embodiment, base 5 is covered with top sheet 3, which is preferably a non-woven fabric layer with a low coefficient of friction so as to minimize the possibility of blisters. In a preferred embodiment, the fabric is treated with an antibacterial agent, which in combination with a moisture barrier reduces odor causing bacteria and fungi.

FIG. 8 is a section view along the middle of the insole. Insole 1 preferably comprises a top sheet 3 and a base 5 having a top surface 5A secured to said top sheet and an opposite bottom surface 5B. Preferably, said top surface 5A of said base layer 5 defines an upwardly-extending portion or metatarsal dome 38 that lies under the metatarsal head area of the foot. Base 5 also defines a longitudinal arch support 6 that extends upwardly along the medial side of the insole to provide extra cushion and support to the arch area of the foot.

The bottom surface 5B of base 5 defines a forefoot pad recession area 7 in the forefoot area, a first metatarsal head pad recession area in the area of the first metatarsal, a lateral midfoot pod recession area in the middle of the insole near the lateral side, a lateral heel pod recession area 13 in the heel area near the lateral side, a medial heel pod recession area 15 in the heel area near the medial side, and an arch recession area from the middle of the insole towards the heel area near the medial side.

Metatarsal dome 38 preferably lies under the second to fifth metatarsal heads. Metatarsal dome 38 provides a redistribution of pressure away from the lesser metatarsal heads for general forefoot comfort and relatively increases the depth of the first metatarsal head pad recession area 9 to encourage a greater degree of first ray plantarflexion during the propulsive phase of gait.

The forefoot pad recession area 7 begins near the distal end of the insole and extends under the hallux proximally to the front of the first metatarsal head. The forefoot pad recession area 7 then extends laterally and proximally under the lesser metatarsal heads to the back of the metatarsal heads. Forefoot pad recession area 7 in essence fully surrounds the distal and lateral sides of the first metatarsal head pad.

Forefoot pad 8 is shaped essentially the same as forefoot pad recession area 7 and is secured therein. Forefoot pad 8 has a medial edge, a lateral edge, a proximal (back) edge and a distal (front) edge. The medial edge of forefoot pad 8 extends along a line spaced laterally from said medial border of said insole, essentially extending from near said toe end to the proximal edge of said metatarsal pad area. The proximal edge extends from said medial edge transversely diagonally (or laterally and proximally) to said lateral edge, which is spaced medially from said lateral border of said insole. The lateral edge connects said proximal edge to said top edge of said forefoot pad, as best seen in FIG. 4. In use, forefoot pad recession area 7 and forefoot pad 8 underlie the big toe of a user's foot, and the "ball" of the foot, excluding the first metatarsal head or medial ball of the user's foot. (See FIG. 11, bones of foot on insole).

The forefoot pad recession area 7 may be lined with a forefoot pad area cloth 8A having a base surface and a pad surface, secured to said base along said base surface and said forefoot pad along said pad surface. Alternatively, a fabric may be secured to forefoot pad 8 and the composite structure secured to forefoot pad recession area 7 and inserted and secured to said forefoot pad recession area 7 by adhesion. An adhesive may be used to secure the components. The forefoot pad 8 provides cushioning and energy return on landing from a vertical jump. It serves as a propulsion pad beneath the big toe (hallux). The portion of the forefoot pad between the lateral border and the portion underlying the big toe in use serves as a propulsion pad and support for the lesser metatarsal heads of a user's foot.

Lateral heel pod recession area 13 extends through the heel area along the lateral side of heel area on the bottom surface 5B toward the heel end. Lateral heel pod 14 is shaped essentially the same as lateral heel pod recession area 13 and is attached to said lateral heel pod recession area 13 of said insole base 5. Lateral heel pod 14 (and a fabric secured thereto) has a lateral edge which extends along the lateral border of insole 1 from said heel end to a lateral heel edge spaced apart from said lateral midfoot pod. The lateral edge curves in the area of the heel to follow the outline of the insole heel end. The lateral heel pod 14 also has a medial curvilinear edge. The overall configuration is roughly a three-sided geometric shape with curved edges as described rather than straight lines.

The configuration, material and position of the lateral heel pod 14 provides cushioning and, in association with the medial heel pod 16, an increase in GRF to the lateral aspect of the user's heel to help reduce the incidence of lateral ankle roll-overs. The hardness of the lateral heel pod is preferably essentially the same as the lateral midfoot pod, which work in concert to help reduce the incidence of lateral ankle roll-overs. It is preferably made of TPR having an ASKER C value of 50.+−.3. A fabric 14A is in turn secured to the base in the lateral heel pod recession area of said base. The fabric 14A component allows the TPR to properly adhere to the base. Alternatively, the configuration, material and position of the lateral heel pod 14 provides cushioning and, in association with the medial heel pod 16, an increase in GRF to the medial aspect of the user's heel to help reduce the incidence of medial ankle roll-overs.

Due to the properties of the TPR and the open-cell hexagonal honeycomb-like design, the lateral heel pod is likely to reduce the impact transient at heel strike "cushioning" the contact phase of gait.

Medial heel pod recession area 15 extends through the heel area along the medial side of heel area on the bottom surface 5B just short of the heel end. Medial heel pod 16 is shaped essentially the same as medial heel pod recession area 15 and is attached to medial heel pod recession area 15 of said base 5. The medial heel pod 16 has essentially a pea-pad shape; it has a medial edge and a lateral edge which are connected to one another at a first distal apex and a second proximal apex. The edges widen out opposite one another to define said medial heel pod.

By virtue of the fact that it pistons through the EVA shell, the medial heel pod is likely to increase the GRF against the medial plantar aspect of the heel—increasing the supination and reducing the pronation moments around the rearfoot—when the heel moves into a markedly everted position.

It has been found to be advantageous to use a softer TPR for the medial heel pod as compared to the lateral heel pod and lateral midfoot pod. This promotes a reduction in supination moments around the joints of the rearfoot (i.e. the tendency to tip the heel into inversion) and an increase in pronation moments, while the joints of the rearfoot do not themselves necessarily move to achieve the kinematic effect. The use of dual density heel pods is employed to cause a kinetic change in foot function to promote ankle stability during court sports. Preferably, the hardness of medial heel pod 16 is preferably ASKER C 45-50. It is also not out of the scope of the invention to have the medial heel pod firmer than the lateral heel pod or lateral midfoot pod or any combination thereof to address different joint moments or ankle rolls. A fabric 16A is in turn secured to the base in the lateral heel pod recession area of said base. The fabric 16A component allows the gel to properly adhere to the base.

The lateral midfoot pod and lateral heel pod 14 are firmer than the medial heel pod 16. The effect is to increase the magnitude of GRF to the outside of the foot to help prevent lateral ankle roll-overs. The difference in material density between the heel pods modulates the GRF to provide this benefit. The pods provide cushioning, but the differential in the firmness of the pods modulates the GRF to improve ankle stability. It is also not out of the scope of the invention to have the lateral heel pod and/or lateral midfoot pod softer than the medial heel pod or any combination thereof to address different joint moments or ankle rolls. The length and width is preferably sufficient to place the lateral midfoot pod beneath the cuboid bone and the bases of the 4th and 5th metatarsal bones as shown in FIG. 11.

Base 5 has a raised edge that wraps around the heel and extends partially along the sides of the foot such that the insole has a heel cup, which conforms to the natural shape of the foot. Base 5 is preferably made of foam or other material having suitable cushioning properties. Preferably, base 5 comprises an Ethylene vinyl acetate ("EVA") foam which is a copolymer of ethylene and vinyl acetate. A preferred EVA foam has a durometer (hardness) of about Asker C 45-60.

Forefoot pad 8 is preferably made from Thermoplastic Rubber ("TPR"). The hardness of the TPR used in the forefoot pad is preferably about 52 Asker C±3. The respective pad may be backed with a fabric before insertion into the area defined by the base to receive such pads.

The various pads and pods may be constructed with an open-cell design. This allows for use of less material and therefore a lighter insole while still providing the desired cushioning function. The cells may be backed with a fabric and the depth of the cells may be between about 3.5 and 5 mm. Alternatively, solid pads or pods may be utilized.

The open-cell design is preferably a honeycomb-like structure. A greater depth of the open-cell may provide different cushioning and spring properties as it acts more as an air cushion. Additionally, extending said air holes 21 through an open-cell may provide different cushioning and spring properties as it would allow various open-cells to more fully collapse as compared to the surrounding open-cells.

For a men's size 11-12 insole, the width of the forefoot pad from the medial to lateral side is about 85 to 95 mm. The height is about 100 to 110 mm. The depth is about 0.95 to 1.50 mm. The forefoot pad may be presented as a modified open-cell design. The modified open-cell design provides open-cells that do not extend the entire thickness of the pad or pod with approximately half the thickness of the pad or pod as a solid material and approximately the other half with the open-cell design. This may be advantageous for creating smaller air cushion pockets where less air cushioning resistance is desired.

It is desirable to minimize the total weight of the insoles by selection of materials working with the structural features of the insole. It is desirable that the total weight of the insole (men's size 10/11) be about 5.0 to 6 ounces and men's size 12/13 about 6.5 to 7.5 ounces. Other sizes will be proportional. Using the open-cell designs may be a way to provide a lighter insole.

In a preferred embodiment, base 5 is covered with top sheet 3, which is preferably a non-woven fabric layer with a low coefficient of friction so as to minimize the possibility of blisters. In a preferred embodiment, the fabric is treated with an antibacterial agent, which in combination with a moisture barrier reduces odor causing bacteria and fungi. A series of air holes 21 may extend through top sheet 3 and base 5 to permit air circulation above and below insole 1.

In a first preferred embodiment of the present invention, the various components of an insole which are secured to base 5 in the recesses defined by base 5 on bottom surface 5B are permanently affixed to base 5 using an appropriate means such as an adhesive. The components may be secured during the molding process using techniques known in the art of molding insoles.

FIG. 9 illustrates a cross section 9-9 as identified in FIGS. 3 and 4. Insole 1 preferably comprises a top sheet 3 and a base 5 having a top surface 5A secured to said top sheet and an opposite bottom surface 5B. Preferably, said top surface 5A of said base layer 5 defines an upwardly-extending portion or metatarsal dome 38 that lies under the metatarsal head area of the foot. The bottom surface 5B of base 5 defines a forefoot pad recession area 7 in the forefoot area, a first metatarsal head pad recession area 9 in the area of the first metatarsal, a lateral midfoot pod recession area in the middle of the insole near the lateral side, a lateral heel pod recession area in the heel area near the lateral side, a medial heel pod recession area in the heel area near the medial side, and an arch recession area from the middle of the insole towards the heel area near the medial side.

Metatarsal dome 38 preferably lies under the second to fifth metatarsal heads. Metatarsal dome 38 provides a redistribution of pressure away from the lesser metatarsal heads for general forefoot comfort and relatively increases the depth of the first metatarsal head pad recession area 9 to encourage a greater degree of first ray plantarflexion during the propulsive phase of gait.

The forefoot pad recession area 7 begins near the distal end of the insole and extends under the hallux proximally to the front of the first metatarsal head. The forefoot pad recession area 7 then extends laterally and proximally under the lesser metatarsal heads to the back of the metatarsal heads. Forefoot pad recession area 7 in essence fully surrounds the distal and lateral sides of the first metatarsal head pad 10.

Forefoot pad 8 is shaped essentially the same as forefoot pad recession area 7 and is secured therein. Forefoot pad 8 has a medial edge, a lateral edge, a proximal (back) edge and a distal (front) edge. The medial edge of forefoot pad 8 extends along a line spaced laterally from said medial border of said insole, essentially extending from near said toe end to the proximal edge of said metatarsal pad area. The proximal edge extends from said medial edge transversely diagonally (or laterally and proximally) to said lateral edge, which is spaced medially from said lateral border of said insole. The lateral edge connects said proximal edge to said top edge of said forefoot pad, as best seen in FIG. 4. In use, forefoot pad recession area 7 and forefoot pad 8 underlie the big toe of a user's foot, and the "ball" of the foot, excluding the first metatarsal head or medial ball of the user's foot. (See FIG. 11, bones of foot on insole).

The forefoot pad recession area 7 may be lined with a forefoot pad area cloth 8A having a base surface and a pad surface, secured to said base along said base surface and said forefoot pad along said pad surface. Alternatively, a fabric may be secured to forefoot pad 8 and the composite structure secured to forefoot pad recession area 7 and inserted and secured to said forefoot pad recession area 7 by adhesion. An adhesive may be used to secure the components. The forefoot pad 8 provides cushioning and energy return on landing from a vertical jump. It serves as a propulsion pad beneath the big toe (hallux). The portion of the forefoot pad between the lateral border and the portion underlying the big toe in use serves as a propulsion pad and support for the lesser metatarsal heads of a user's foot.

First metatarsal head pad recession area 9 is a recess in the bottom surface 5B of the base 5 and lies under the first metatarsal head of the foot. First metatarsal head pad 10 is shaped essentially the same as first metatarsal head pad recession area 9 and is secured to first metatarsal head pad recession area 9. A first metatarsal head pad area cloth 10A may be secured to the base layer on one side and the metatarsal pad on the other, similar to that described above in relation to said forefoot pad. Alternatively, a fabric may be instead secured to said metatarsal pad, and the composite structure inserted and secured to said metatarsal pad recession area by adhesion.

In basketball, and other court sports, it is important that the metatarsophalangeal joints between the heads of the metatarsal bones and the bases of the proximal phalanges (toes) of the user's foot are free to dorsiflex, an upward or backward flexion. Forefoot pad 8 and first metatarsal head pad 10 can move independently from one another due to differential in densities. Forefoot pad 8 is preferably firmer than first metatarsal head pad 10. Forefoot pad 8 supports the lesser metatarsal heads and first metatarsal head pad 10 allows the first metatarsal head to depress into a lower position allowing more efficient dorsiflexion of the first toe joint. The area of forefoot pad 8 beneath the great toe adds a slight push up force to also encourage improved big toe joint dorsiflexion. In this manner, forefoot pad 8 may have less density then the first metatarsal head pad 10, depending on the physical characteristics desired and the intended use of the insole by the user. Alternatively, a softer forefoot pad 8 than first metatarsal head pad 10 limits the dorsiflexion of the first toe joint as that may be advantageous in the use of the insole in various activities and physical movements.

Forefoot pad 8 has a different density than the first metatarsal head pad 10 and may have different densities compared to the other pad and pod inserts by using different materials, an open-cell design, or varying the thickness of the forefoot pad 8. The use of different densities on the forefoot pad 8 compared to the first metatarsal head pad 10 increases the performance of the insole in handling lateral force impacts by allowing for improved hallux dorsiflexion.

The open-cell design is preferably a honeycomb-like structure. A greater depth of the open-cell may provide different cushioning and spring properties as it acts more as an air cushion. Additionally, extending said air holes 21 through an open-cell may provide different cushioning and spring properties as it would allow various open-cells to more fully collapse as compared to the surrounding open-cells.

The forefoot pad may be presented as a modified open-cell design. The modified open-cell design provides open-cells that do not extend the entire thickness of the pad or pod with approximately half the thickness of the pad or pod as a solid material and approximately the other half with the open-cell design. This may be advantageous for creating smaller air cushion pockets where less air cushioning resistance is desired.

It is estimated that using tougher materials may increase the durability of the insole by 35% to 65% over insoles that use softer materials for this portion of the foot insole.

In use, first metatarsal head pad 10 remains under the first metatarsal head (i.e., the medial ball of the user's foot) and moves with it. This may also be thought of in terms of reducing the GRF beneath the first metatarsal head. This enhances propulsion of the foot in wearers with FHL. The portion of forefoot pad 8 near the lateral border of the insole concurrently supports the lesser metatarsal heads of the user's foot. When the user dorsiflexes the first metatarsophalangeal joint (the big toe joint), the forefoot pad area near the medial border of the insole in the toe area applies a gentle upwards force to encourage improved dorsiflexion of the first toe joint of the user's foot.

The first metatarsal head pad 10, in shape, is a slightly irregular rectangular or polygonal shape. Preferably, said first metatarsal head pad 10 has an essentially linear distal edge, a slightly curvilinear medial edge which follows the curve of the medial border of the insole, a proximal edge which is curved or angled to follow the shape of the metatarsal edge of longitudinal arch support 6, and a lateral edge which is curvilinear or linear. Preferably, said first metatarsal head pad 10 is about 4.5 mm thick. Thickness gives sufficient initial support but allows for adequate compression once loaded. First metatarsal head pad's 10 basic design is to create differential in support under the metatarsal heads and allow the first metatarsal head to drop below the plane of the other metatarsal heads.

Base 5 is preferably made of foam or other material having suitable cushioning properties. Preferably, base 5 comprises an Ethylene vinyl acetate ("EVA") foam which is a copolymer of ethylene and vinyl acetate. A preferred EVA foam has a durometer (hardness) of about Asker C 45-60.

Forefoot pad 8 and first metatarsal head pad 10 are preferably made from Thermoplastic Rubber ("TPR"). The hardness of the TPR used in the forefoot pad is preferably about 52 Asker C±3. The hardness of the TPR used in the first metatarsal head pad is preferably about 49 Asker C ±3. The reason that the hardness of the TPRs preferably varies is to create differential in support under the metatarsal heads and allow the first metatarsal head to drop below the plane of the other metatarsal heads. The respective pads may be backed with a fabric before insertion into the area defined by the base to receive such pads.

The various pads and pods may be constructed with an open-cell design. This allows for use of less material and therefore a lighter insole while still providing the desired cushioning function. The cells may be backed with a fabric and the depth of the cells may be between about 3.5 and 5 mm. Alternatively, solid pads or pods may be utilized.

The open-cell design is preferably a honeycomb-like structure. A greater depth of the open-cell may provide different cushioning and spring properties as it acts more as an air cushion. Additionally, extending said air holes 21 through an open-cell may provide different cushioning and spring properties as it would allow various open-cells to more fully collapse as compared to the surrounding open-cells.

For a men's size 11-12 insole, the width of the forefoot pad from the medial to lateral side is about 85 to 95 mm. The height is about 100 to 110 mm. The depth is about 0.95 to 1.50 mm. The forefoot pad may be presented as a modified open-cell design. The modified open-cell design provides open-cells that do not extend the entire thickness of the pad or pod with approximately half the thickness of the pad or pod as a solid material and approximately the other half with the open-cell design. This may be advantageous for creating smaller air cushion pockets where less air cushioning resistance is desired.

It is desirable to minimize the total weight of the insoles by selection of materials working with the structural features of the insole. It is desirable that the total weight of the insole (men's size 10/11) be about 5.0 to 6 ounces and men's size 12/13 about 6.5 to 7.5 ounces. Other sizes will be proportional. Using the open-cell designs may be a way to provide a lighter insole.

In a preferred embodiment, base 5 is covered with top sheet 3, which is preferably a non-woven fabric layer with a low coefficient of friction so as to minimize the possibility of blisters. In a preferred embodiment, the fabric is treated with an antibacterial agent, which in combination with a moisture barrier reduces odor causing bacteria and fungi.

In a first preferred embodiment of the present invention, the various components of an insole which are secured to base 5 in the recesses defined by base 5 on bottom surface 5B are permanently affixed to base 5 using an appropriate means such as an adhesive. The components may be secured during the molding process using techniques known in the art of molding insoles.

Figure 10:
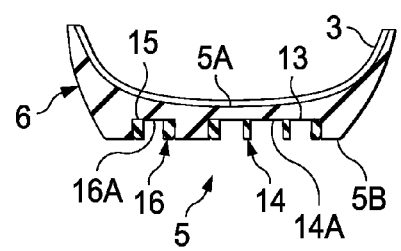
FIG. 10 is a transverse cross sectional view along the heel area of the insole.

FIG. 10 illustrates a cross section 10-10 as identified in FIGS. 3 and 4. Insole 1 preferably comprises a top sheet 3 and a base 5 having a top surface 5A secured to said top sheet and an opposite bottom surface 5B. The bottom surface 5B of base 5 defines a forefoot pad recession area in the forefoot area, a first metatarsal head pad recession area in the area of the first metatarsal, a lateral midfoot pod recession area in the middle of the insole near the lateral side, a lateral heel pod recession area 13 in the heel area near the lateral side, a medial heel pod recession area 15 in the heel area near the medial side, and an arch recession area from the middle of the insole towards the heel area near the medial side.

Lateral heel pod recession area 13 extends through the heel area along the lateral side of heel area on the bottom surface 5B toward the heel end. Lateral heel pod 14 is shaped essentially the same as lateral heel pod recession area 13 and is attached to said lateral heel pod recession area 13 of said insole base 5. Lateral heel pod 14 (and a fabric secured thereto) has a lateral edge which extends along the lateral border of insole 1 from said heel end to a lateral heel edge spaced apart from said lateral midfoot pod. The lateral edge curves in the area of the heel to follow the outline of the insole heel end. The lateral heel pod 14 also has a medial curvilinear edge. The overall configuration is roughly a three-sided geometric shape with curved edges as described rather than straight lines.

The configuration, material and position of the lateral heel pod 14 provides cushioning and, in association with the medial heel pod 16, an increase in GRF to the lateral aspect of the user's heel to help reduce the incidence of lateral ankle roll-overs. The hardness of the lateral heel pod is preferably essentially the same as the lateral midfoot pod, which work in concert to help reduce the incidence of lateral ankle roll-overs. It is preferably made of TPR having an ASKER C value of 50±3. A fabric 14A is in turn secured to the base in the lateral heel pod recession area of said base. The fabric 14A component allows the TPR to properly adhere to the base. Alternatively, the configuration, material and position of the lateral heel pod 14 provides cushioning and, in association with the medial heel pod 16, an increase in GRF to the medial aspect of the user's heel to help reduce the incidence of medial ankle roll-overs.

Due to the properties of the TPR and the open-cell hexagonal honeycomb-like design, the lateral heel pod is likely to reduce the impact transient at heel strike "cushioning" the contact phase of gait.

Medial heel pod recession area 15 extends through the heel area along the medial side of heel area on the bottom surface 5B just short of the heel end. Medial heel pod 16 is shaped essentially the same as medial heel pod recession area 15 and is attached to medial heel pod recession area 15 of said base 5. The medial heel pod 16 has essentially a pea-pad shape; it has a medial edge and a lateral edge which are connected to one another at a first distal apex and a second proximal apex. The edges widen out opposite one another to define said medial heel pod.

By virtue of the fact that it pistons through the EVA shell, the medial heel pod is likely to increase the GRF against the medial plantar aspect of the heel—increasing the supination and reducing the pronation moments around the rearfoot—when the heel moves into a markedly everted position.

It has been found to be advantageous to use a softer TPR for the medial heel pod as compared to the lateral heel pod and lateral midfoot pod. This promotes a reduction in supination moments around the joints of the rearfoot (i.e. the tendency to tip the heel into inversion) and an increase in pronation moments, while the joints of the rearfoot do not themselves necessarily move to achieve the kinematic effect. The use of dual density heel pods is employed to cause a kinetic change in foot function to promote ankle stability during court sports. Preferably, the hardness of medial heel pod 16 is preferably ASKER C 45-50. It is also not out of the scope of the invention to have the medial heel pod firmer than the lateral heel pod or lateral midfoot pod or any combination thereof to address different joint moments or ankle rolls. A fabric 16A is in turn secured to the base in the lateral heel pod recession area of said base. The fabric 16A component allows the gel to properly adhere to the base.

The lateral midfoot pod and lateral heel pod 14 are firmer than the medial heel pod 16. The effect is to increase the magnitude of GRF to the outside of the foot to help prevent lateral ankle roll-overs. The difference in material density between the heel pods modulates the GRF to provide this benefit. The pods provide cushioning, but the differential in the firmness of the pods modulates the GRF to improve ankle stability. It is also not out of the scope of the invention to have the lateral heel pod and/or lateral midfoot pod softer than the medial heel pod or any combination thereof to address different joint moments or ankle rolls. The length and width is preferably sufficient to place the lateral midfoot pod beneath the cuboid bone and the bases of the 4th and 5th metatarsal bones as shown in FIG. 11.

Base 5 has a raised edge that wraps around the heel and extends partially along the sides of the foot such that the insole has a heel cup, which conforms to the natural shape of the foot. As seen in FIGS. 6-10, the height of the raised edge is generally higher and thicker on the medial side of the insole and is lower and thinner on the lateral side of the insole.

Base 5 is preferably made of foam or other material having suitable cushioning properties. Preferably, base 5 comprises an Ethylene vinyl acetate ("EVA") foam which is a copolymer of ethylene and vinyl acetate. A preferred EVA foam has a durometer (hardness) of about Asker C 45-60.

The various pads and pods may be constructed with an open-cell design. This allows for use of less material and therefore a lighter insole while still providing the desired cushioning function. The cells may be backed with a fabric and the depth of the cells may be between about 3.5 and 5 mm. Alternatively, solid pads or pods may be utilized.

The open-cell design is preferably a honeycomb-like structure. A greater depth of the open-cell may provide different cushioning and spring properties as it acts more as an air cushion. Additionally, extending said air holes 21 through an open-cell may provide different cushioning and spring properties as it would allow various open-cells to more fully collapse as compared to the surrounding open-cells.

It is desirable to minimize the total weight of the insoles by selection of materials working with the structural features of the insole. It is desirable that the total weight of the insole (men's size 10/11) be about 5.0 to 6 ounces and men's size 12/13 about 6.5 to 7.5 ounces. Other sizes will be proportional. Using the open-cell designs may be a way to provide a lighter insole.

In a preferred embodiment, base 5 is covered with top sheet 3, which is preferably a non-woven fabric layer with a low coefficient of friction so as to minimize the possibility of blisters. In a preferred embodiment, the fabric is treated with an antibacterial agent, which in combination with a moisture barrier reduces odor causing bacteria and fungi.

In a first preferred embodiment of the present invention, the various components of an insole which are secured to base 5 in the recesses defined by base 5 on bottom surface 5B are permanently affixed to base 5 using an appropriate means such as an adhesive. The components may be secured during the molding process using techniques known in the art of molding insoles.

FIG. 11 illustrates the bones of the foot superimposed over a bottom view of the insole of the present invention. At the heel of the foot is the calcaneus 70 and forward of the calcaneus 70 is the talus 72. Forward of the talus 72 on the medial side is the navicular 74 and on the lateral side is the cuboid 76. Forward of the cuboid 76 and the navicular 74 are cuneiforms 78. Forward of the cuneiforms 78 and cuboid 76 are the metatarsals 80A-80E. The first metatarsal 80A is located on the medial side of the foot and the fifth metatarsal 80E is located on the lateral side of the foot. Forward of the metatarsals 80A-80E are the proximal phalanges 82. Forward of the proximal phalanges 82 are the middle phalanges 84, and at the end of each toe are the distal phalanges 86.

Figure 12:
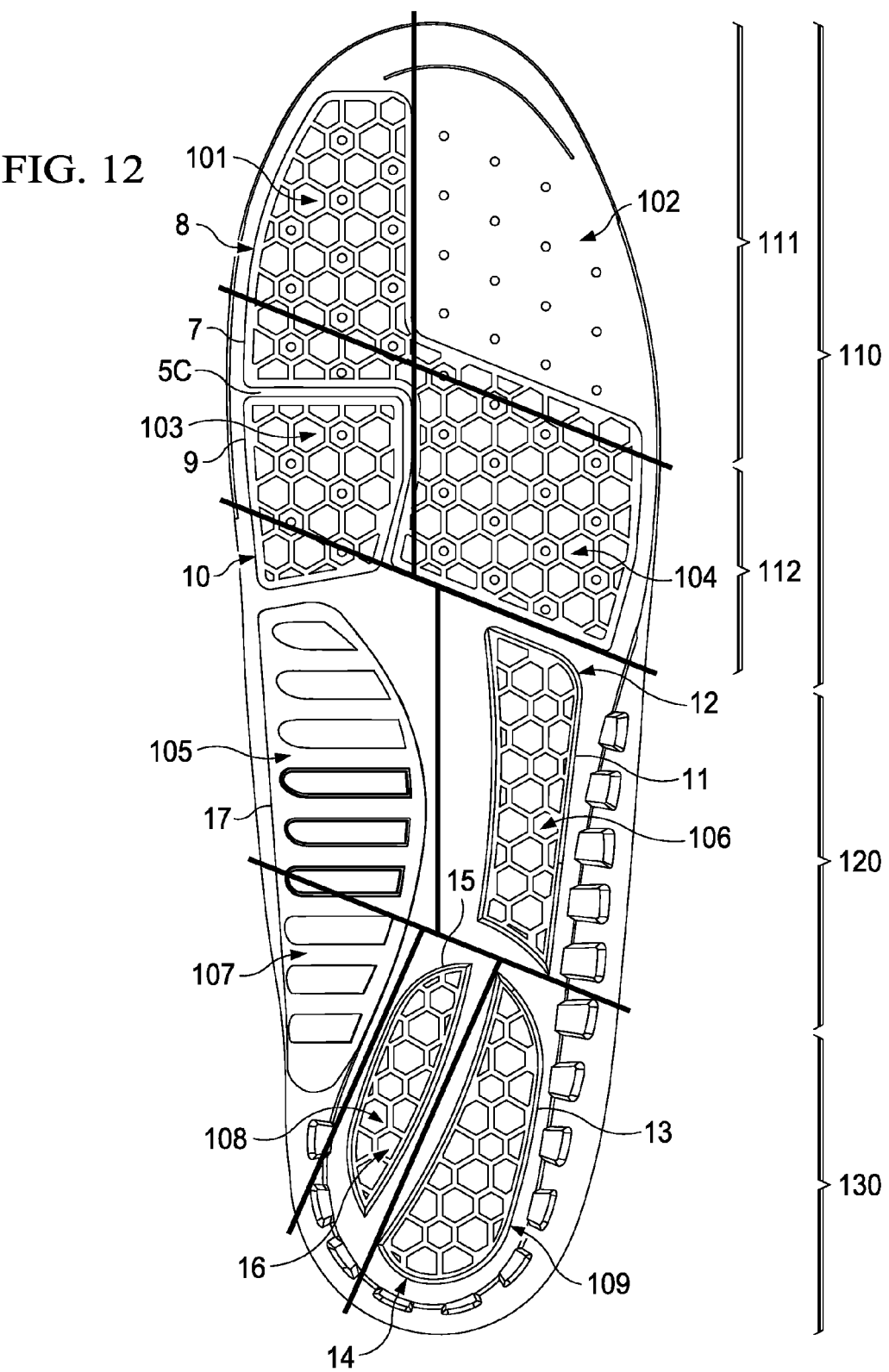
FIG. 12 is a bottom view illustrating the various areas of the insole.

FIG. 12 shows the bottom view of the insole (similar to FIG. 4) and illustrates the various areas of the insole: hallux area 101, lesser toe area 102, first metatarsal head area 103, lesser metatarsal head area 104, distal medial arch area 105, lateral midfoot area 106, proximal medial arch area 107, medial heel area 108, lateral heel area 109, forefoot area 110, toe area 111, metatarsal head area 112, midfoot area 120, and heel area 130.

Forefoot area 110 comprises toe area 111 and metatarsal head area 112, encompassing the entire width of the insole from the toe end to just behind the metatarsal heads or "balls" of the feet. Toe area 111, which comprises the hallux area 101 and the lesser toe area 102, has a length extending from the toe end to a diagonal edge that runs generally behind the first distal phalange and second through fifth proximal phalanges and forward of the metatarsal heads. Toe area 111 has a width extending from the medial border to the lateral border. Metatarsal head area 112, comprising first metatarsal head area 103 and lesser metatarsal head area 104, has a length extending from a front diagonal edge, adjacent the diagonal edge of toe area 111, to a back diagonal edge that generally runs behind the metatarsal heads. Metatarsal head area 112 has a width extending from the medial border to the lateral border.

Hallux area 101 has a length extending from a front edge near the toe end to a back edge near the joint between the first proximal phalange and first metatarsal and a width extending from the medial border to a lateral edge near the second phalanges. Lesser toe area 102 has a length extending from a front edge near the toe end to a back edge near the second through fifth proximal phalanges and a width extending from a medial edge, medial of the second phalanges and adjacent the lateral border of hallux area 101, to a lateral edge near the lateral border. The back edge of lesser toe area 102 runs generally parallel to the second through fifth metatarsal heads.

The first metatarsal head area 103 extends from a front edge forward of the first metatarsal head and adjacent the back edge of hallux area 101 to a back edge just behind the first metatarsal head and adjacent a front edge of midfoot area 120. The width of first metatarsal head area 103 extends from the medial border to a lateral edge near the second metatarsal head. Lesser metatarsal head area 104 extends from a front edge forward of the second through fifth metatarsal heads and adjacent the back edge of lesser toe area 102 or diagonal edge of toe area 111 to a back edge behind the second through fifth metatarsal heads and adjacent a front edge of midfoot area 120. The width of lesser metatarsal head area 104 extends from the lateral edge of the first metatarsal head area 103 to the lateral border.

Midfoot area 120 comprises distal medial arch area 105 and lateral midfoot area 106. Midfoot area 120 has a front edge adjacent forefoot area 110 or metatarsal head area 112 and a back edge that runs diagonally from between the talus and navicular on the medial side to just behind the cuboid on the lateral side. Midfoot area 120 has a width extending from the medial border to the lateral border.

Distal medial arch area 105 extends from a front edge just behind the first metatarsal head and adjacent the back edge of first metatarsal head area 103 or back diagonal edge of metatarsal head area 112 to a back edge between the talus and navicular. The width of distal medial arch area 105 extends from the medial border to near the middle of the foot. Lateral midfoot area 106 extends from a front edge just behind the second through fifth metatarsal heads and adjacent the back edge of lesser metatarsal head area 104 or back diagonal edge of metatarsal head area 112 to a back edge just behind the cuboid. The width of lateral midfoot area extends from near the middle of the foot to the lateral border.

Heel area 130 comprises proximal medial arch area 107, medial heel area 108, and lateral heel area 109. Heel area 130 has a front edge adjacent the back edge of midfoot area 120 and extends proximally to the heel end. Heel area 130 has a width extending from the medial border to the lateral border.

Proximal medial arch area 107 extends from a front edge between the talus and navicular or adjacent the front edge of heel area 130 to a back point along the medial border about midway between the heel end and the talus. The width of proximal medial arch area 107 extends from the medial border to diagonal lateral edge where the diagonal lateral edge extends from about a third of the insole width laterally from the medial border along the front edge of the heel area 130 to the back point of proximal medial arch area 107.

Lateral heel area 109 extends from a front edge just behind the cuboid or adjacent the front edge of heel area 130 to the heel end. The width of lateral heel area extends from a diagonal medial edge to the lateral border where diagonal medial edge extends from about a third of the insole width medially from the lateral border along the front edge of the heel area 130 to a point just medial of the heel end.

Medial heel area 108 extends from the front edge of the heel area 130 to the medial border just medial of the heel end. The width of medial heel area 108 extends from the lateral diagonal edge of proximal medial arch area 107 to the medial diagonal edge of lateral heel area 109.

Forefoot pad recession area 7 preferably extends the entire hallux area 101 and slightly into first metatarsal head area 103. Forefoot pad recession area 7 then extends diagonally to the entire lesser metatarsal head area 104. Forefoot pad recession area 7 may slightly extend into the back of lesser toe area 102. Forefoot pad recession area 7 may also slightly extend into the front and lateral sides of first metatarsal head area 103. Forefoot pad 8 is secured to the forefoot pad recession area 7.

The majority of first metatarsal head recession area 9 is located in the first metatarsal head area 103. Preferably, a front edge of first metatarsal head recession area 9 lies slightly proximal of the front edge of first metatarsal head area 103 and adjacent forefoot pad recession area 7. First metatarsal head recession area 9 may also extend into the distal medial arch area 105. First metatarsal head pad 10 is secured to the first metatarsal head recession area 9. Divider SC may also be employed to help further distinguish the edges of first metatarsal head recession area 9 and forefoot pad recession area 7.

Arch recession area 17 is located in the majority of both the distal medial arch area 105 and proximal medial arch area 107. A front edge of arch recession area 17 is adjacent a back edge of first metatarsal head recession area 9. Arch support 18 is secured to arch recession area 17.

Lateral midfoot pod recession area 11 is located approximately in the middle third of the lateral midfoot area 106. Lateral midfoot pod recession area 11 extends essentially the entire length of lateral midfoot area 106. Lateral midfoot pod 12 is secured to lateral midfoot pod recession area 11.

Medial heel pod recession area 15 is located in the majority of the medial heel area 108. Medial heel pod 16 is secured to medial heel pod recession area 15. Lateral heel pod recession area 13 is located in the majority of the lateral heel area 109. Lateral heel pod 14 is secured to lateral heel pod recession area 13.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Having described the invention, we claim:

1. An insole having a top side configured to contact a user's foot and a bottom side configured to contact the inside of a user's shoe, comprising:

a. a base, said base having a base top surface and a base bottom surface, said base having a heel end, a toe end, a medial border and a lateral border, said borders extending from said heel end to said toe end, said base bottom surface defining a forefoot area configured to extend from the toe end to a location behind a metatarsal head area of said user's foot, a midfoot area configured to extend from said metatarsal head area to an edge that is configured to lie forward of the calcaneal area of said user's foot, and a heel area that is configured to extend from said midfoot area to said heel end, said base further defining a forefoot pad recession area in said base bottom surface and a first metatarsal head pad recession area configured to extend in said forefoot area in said base bottom surface, and an arch recession area on a medial side of said base bottom surface, an integrally formed longitudinal arch support and one or more pod recession areas located in said midfoot and heel areas of said base bottom surface, said longitudinal arch support integrally formed in said base extending upwardly along the medial border and configured to extend under the medial arch area of said user's foot;

b. a graduated arch support made of semi-rigid material, said graduated arch support secured to said arch recession area of said base bottom surface, said arch recession area located along the longitudinal arch support having a proximal edge end nearest the heel end of the base and extending toward said toe end of the base to a distal edge end adjacent said first metatarsal head pad recession area, said proximal edge end and distal edge end connected by a medial edge near said medial border and a lateral edge near a middle of the base, said lateral edge having a parabolic-like shape;

c. a forefoot pad secured to said forefoot pad recession area, said forefoot pad recession area configured to extend under a hallux area of said user's foot from near the distal end of the base proximally configured to extend to an area under the first metatarsal head, said forefoot pad recession area further configured to extend laterally and proximally under the lesser metatarsal heads area of said user's foot to the back of the metatarsal heads;

d. a first metatarsal head pad secured to said first metatarsal head pad recession area, said first metatarsal head pad recession area configured to extend under the first metatarsal head area of said user's foot, a distal edge and a lateral edge of said first metatarsal head pad recession adjacent a proximal edge and a medial edge of said forefoot pad, said forefoot pad having a firmer density than said first metatarsal head pad; and e. interacting cooperative pod components integrated into said one or more pod recession areas on said base bottom surface, said pod components having a lateral heel pod inserted into a pod recession area located on the lateral side of said heel area.

2. The insole of claim 1, wherein said pod components further have a lateral midfoot pod inserted into one of said one or more pod recession areas located on the lateral side of said midfoot area.

3. The insole of claim 1, wherein said pod components further have a medial heel pod inserted into one of said one or more pod recession areas located on the medial side of said heel area.

4. The insole of claim 1, wherein said pod components further have a lateral midfoot pod inserted into one of said one or more pod recession areas located on the lateral side of said midfoot area and a medial heel pod inserted into one of said one or more pod recession areas located on the medial side of said heel area.

5. The insole of claim 4, wherein said lateral midfoot pod and said medial heel pod components are made of a firmer material than said lateral heel pod.

6. The insole of claim 4, wherein said lateral midfoot pod and said medial heel pod components are made of a softer material than said lateral heel pod.

7. The insole of claim 4, wherein said lateral midfoot pod and said medial heel pod components are made of a material of the same firmness of said lateral heel pod.

8. The insole of claim 1, wherein said graduated arch support defines one or more ribs extending outwardly therefrom.

9. The insole of claim 8, wherein said one or more ribs extending outwardly from said graduated arch support are approximately 0.5 mm thick.

10. The insole of claim 1, wherein said graduated arch support defines one or more essentially level ribs having a rib outline indented in said arch support.

11. The insole of claim 10, wherein said one or more essentially level ribs are approximately 0.5 mm deep.

12. The insole of claim 1, wherein said graduated arch support defines one or more rib-shaped openings.

13. The insole of claim 12, wherein said one or more rib-shaped openings allow said base to extend therethrough to mechanically lock said graduated arch support to said base and provide additional cushioning and support to the arch when under compression.

14. The insole of claim 12, wherein said one or more rib-shaped openings have a width of approximately 0.5 mm.

15. An insole having a top side configured to contact a user's foot and a bottom side configured to contact the inside of a user's shoe, comprising:

a. a base, said base having a base top surface and a base bottom surface, said base having a heel end, a toe end, a medial border and a lateral border, said borders extending from said heel end to said toe end, said base bottom surface defining a forefoot area extending from the toe end and configured to extend to a location behind a metatarsal head area of said user's foot, a midfoot area that is configured to extend from said metatarsal head area to an edge that is configured to lie forward of the calcaneal area of said user's foot, and a heel area that extends from said midfoot area to said heel end, said base further defining a forefoot pad recession area in said base bottom surface and a first metatarsal head pad recession area located in said forefoot area in said base bottom surface, and an arch recession area on a medial side of said base bottom surface, a longitudinal arch support integrally formed in said base extending upwardly along the medial border and configured to extend under the medial arch area of said user's foot and one or more pod recession areas located in said midfoot and heel areas of said base bottom surface;

b. a graduated arch support made of semi-rigid material having a plurality of ribs oriented transversely from the medial side to the lateral side of said graduated arch support, said graduated arch support secured to said arch recession area of said base bottom surface, said arch recession area located along the longitudinal arch support having a proximal edge end nearest the heel end of the base and extending toward said toe end of the base to a distal edge end adjacent said first metatarsal head pad recession area, said proximal edge end and distal edge end connected by a medial edge near said medial border and a lateral edge near a middle of the base, said lateral edge having a parabolic-like shape;

c. a forefoot pad secured to said forefoot pad recession area, said forefoot pad recession area configured to extend under a hallux area of said user's foot from near the distal end of the base configured to proximally extend to an area under the first metatarsal head, said forefoot pad recession area further configured to extend laterally and proximally under the lesser metatarsal heads area of said user's foot to the back of the metatarsal heads area; and d. a first metatarsal head pad secured to said first metatarsal head pad recession area, said first metatarsal head pad recession area configured to be located under the first metatarsal head area of said user's foot, a distal edge and a lateral edge of said first metatarsal head pad recession adjacent a proximal edge and a medial edge of said forefoot pad, said forefoot pad having a firmer density than said first metatarsal head pad; and e. one or more pod components integrated into said one or more pod recession areas on said base bottom surface.

16. The insole of claim 15, wherein a lateral heel pod is inserted into one of said pod recession areas located on the lateral side of said heel area.

17. The insole of claim 15, wherein a medial heel pod is inserted into one of said pod recession areas located on the medial side of said heel area.

18. The insole of claim 15, wherein a lateral midfoot pod is inserted into one of said one or more pod recession areas located on the lateral side of said midfoot area.

19. The insole of claim 15, wherein a lateral midfoot pod is inserted into one of said one or more pod recession areas located on the lateral side of said midfoot area, a lateral heel pod is inserted into one of said one or more pod recession areas on the lateral side of the heel area, and a medial heel pod is inserted into one of said one or more pod recession areas located on the medial side of said heel area.

20. The insole of claim 19, wherein said lateral midfoot pod and said lateral heel pod are made of a firmer material than said medial heel pod.

21. The insole of claim 15, wherein one or more of said plurality of ribs extend outwardly from said graduated arch support.

22. The insole of claim 21, wherein said one or more ribs extending outwardly from said graduated arch support are approximately 0.5 mm thick.

23. The insole of claim 15, wherein one or more of said plurality of ribs are essentially level ribs having a rib outline indented in said arch support.

24. The insole of claim 23, wherein said one or more essentially level ribs have a rib outline approximately 0.5 mm deep.

25. The insole of claim 15, wherein one or more of said plurality of ribs are rib-shaped openings.

26. The insole of claim 25, wherein said one or more rib-shaped openings allow said base to extend therethrough to mechanically lock said graduated arch support to said base and provide additional cushioning and support to the arch when under compression.

27. The insole of claim 25, wherein said one or more rib-shaped openings have a width of approximately 0.5 mm.

28. The insole of claim 15, wherein said top surface of said base defines an upward-extending metatarsal dome configured to be located under the metatarsal heads area of the second to fifth metatarsals of said user's foot.

* * * * *